US007079604B1

(12) United States Patent
Miller et al.

(10) Patent No.: US 7,079,604 B1
(45) Date of Patent: Jul. 18, 2006

(54) ULTRAWIDE BANDWIDTH SYSTEM AND METHOD FOR FAST SYNCHRONIZATION USING MULTIPLE DETECTION ARMS

(75) Inventors: Timothy R. Miller, Washington, DC (US); John W. McCorkle, Laurel, MD (US)

(73) Assignee: Freescale Semiconductor, Inc., Austin, TX (US)

( * ) Notice: Subject to any disclaimer, the term of this patent is extended or adjusted under 35 U.S.C. 154(b) by 916 days.

(21) Appl. No.: 09/685,196

(22) Filed: Oct. 10, 2000

(51) Int. Cl.
H04L 27/06 (2006.01)
(52) U.S. Cl. .................. 375/343; 375/142; 375/150; 375/149; 375/347; 370/514
(58) Field of Classification Search .......... 375/343, 375/347, 368, 130, 142–150, 295, 152; 370/514, 370/342, 335; 342/93
See application file for complete search history.

(56) References Cited

U.S. PATENT DOCUMENTS

| 5,677,927 | A | | 10/1997 | Fullerton et al. |
|---|---|---|---|---|
| 5,768,306 | A | * | 6/1998 | Sawahashi et al. ......... 375/150 |
| 6,128,331 | A | * | 10/2000 | Struhsaker et al. ......... 375/142 |
| 6,154,483 | A | * | 11/2000 | Davidovici et al. ......... 375/130 |
| 6,351,246 | B1 | | 2/2002 | McCorkle |
| 6,493,360 | B1 | * | 12/2002 | Nishimura .................. 370/514 |
| 6,505,032 | B1 | | 1/2003 | McCorkle et al. |
| 6,603,818 | B1 | * | 8/2003 | Dress et al. ................ 375/295 |
| 6,650,693 | B1 | * | 11/2003 | Park et al. .................. 375/149 |
| 6,700,939 | B1 | | 3/2004 | McCorkle et al. |
| 6,735,238 | B1 | | 5/2004 | McCorkle |

OTHER PUBLICATIONS

Richard Comerford, IEEE Spectrum, pp. 35-41, "Handhelds Duke it Out for the Internet," Aug. 2000.
F. Ramírez-Mireles, et al., IEEE Comput. Soc., pp. 192-196, "Performance of Ultra-Wideband Time-Shift-Modulated Signals in the Indoor Wireless Impulse Radio Channel," Nov. 2, 1997.
M. Z. Win, et al., IEEE Transactions on Communications, vol. 48, No. 4, pp. 679-691, "Utlra-Wide Bandwidth Time-Hopping Spread-Spectrum Impulse Radio for Wireless Multiple-Access Communications," Apr. 2000.
M. Z. Win, et al., IEEE Annual Military Communications Conference, vol. 3, pp. 1277-1281, "Energy Capture vs. Correlator Resources in Ultra-Wide Bandwidth Indoor Wireless Communications Channels," Nov. 3, 1997.

(Continued)

*Primary Examiner*—Khai Tran
*Assistant Examiner*—Edith Chang
(74) *Attorney, Agent, or Firm*—Posz Law Group, PLC

(57) ABSTRACT

A system and method for fast synchronization of an incoming signal with a UWB receiver rapidly. The present invention synchronizes with a UWB receiver with an incoming signal. The present invention correlates a local pulse generated at the receiver with the incoming signal, finds a phase angle in the correlation function that would correspond to a high signal to noise ratio, thereby matching the receiver to the incoming signal phase, and operates the receiver at that phase. Exemplary options of fast synchronization include using multiple detection arms to compare one parameter of the correlation function to a predetermined threshold.

28 Claims, 22 Drawing Sheets

OTHER PUBLICATIONS

U.S. Appl. No. 60/207,225, filed May 26, 2000, McCorkle.
U.S. Appl. No. 60/217,099, filed Jul. 10, 2000, Miller.
U.S. Appl. No. 09/633,815, filed Aug. 7, 2000, McCorkle.
U.S. Appl. No. 60/238,466, filed Oct. 10, 2000, McCorkle
U.S. Appl. No. 09/684,401, filed Oct. 10, 2000, Miller.
U.S. Appl. No. 09/684,782, filed Oct. 10, 2000, McCorkle.
U.S. Appl. No. 09/685,195, filed Oct. 10, 2000, Miller.
U.S. Appl. No. 09/685,197, filed Oct. 10, 2000, Miller.
U.S. Appl. No. 09/685,198, filed Oct. 10, 2000, McCorkle.
U.S. Appl. No. 09/685,199, filed Oct. 10, 2000, McCorkle.
U.S. Appl. No. 09/685,200, filed Oct. 10, 2000, McCorkle.
U.S. Appl. No. 09/685,202, filed Oct. 10, 2000, Rofheart.
U.S. Appl. No. 09/685,203, filed Oct. 10, 2000, Miller.
U.S. Appl. No. 09/685,205, filed Oct. 10, 2000, McCorkle.

* cited by examiner $Z1 = \{0, n, 2n, 3n, ..., Q-3, Q-2, Q-1\}$.

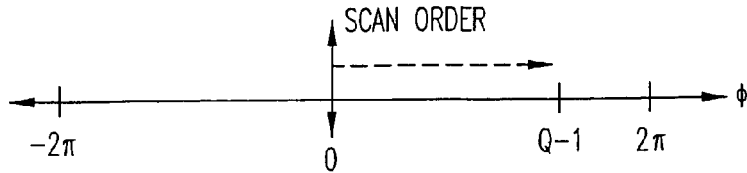

FIG. 14A $Z2 \text{ (FIRST EXAMPLE)} = n*\{[0, m-1], [-1, -2m], [m, 5m-1], [-2m-1, -10m], ..., (Q-1)/n\}$.

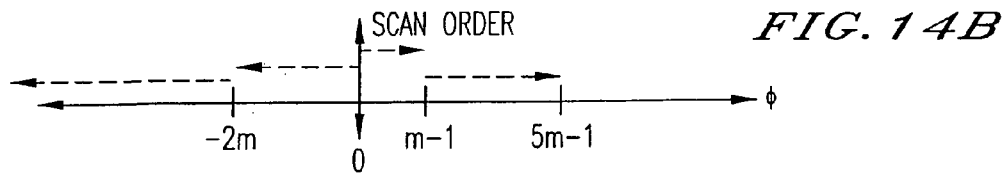

FIG. 14B $Z2 \text{ (SECOND EXAMPLE)} = \{0, n, 2n, ..., (m-1)*n, -n, -2n, ..., -m*n, m*n, (m+1)*n, (m+2)*n, ..., (Q-1)\}$.

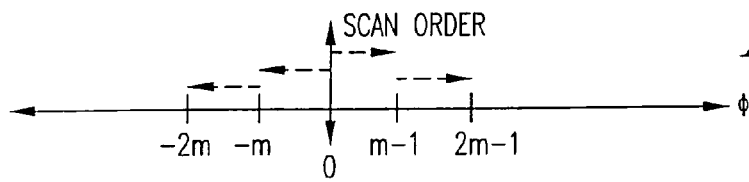

FIG. 14C $Z2 \text{ (THIRD EXAMPLE)} = \{-m*n, (-m+1)*n, (-m+2)*n, ..., -n, 0, n, ..., m*n, (m+1)*n, (m+2)*n, ... 2m*n,$
$(-3m)*n, (-3m+1)*n, (-3m+2)*n, ..., (-m-1)*n, (2m+1)*n, (2m+2)*n, ..., (Q-1)\}$.

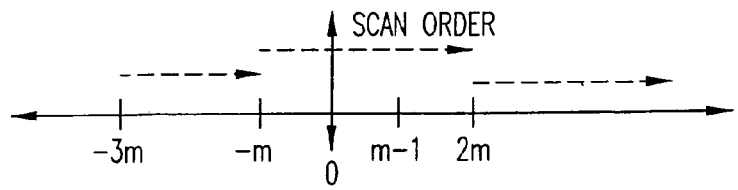

FIG. 14D

WHERE FOR FIGS. 14A, 14B, 14C, AND 14D:

Q = TOTAL NUMBER OF CODEWHEEL INCREMENTS IN EACH CODEWHEEL SPIN. THE MAXIMUM CODEWHEEL SPIN IS A COMPLETE ($2\pi$) CODEWHEEL SPIN, BUT OTHER CODEWHEEL SPINS ARE AVAILABLE;

n = AN ARBITRAY LOCAL PARAMETER THAT CONTROLS HOW FAST THE CODE WHEEL SPINS DEPENDING ON THE TIME INCREMENT STEP SIZE; AND m = A NUMBER OF INCREMENTS LESS THAN THE TOTAL NUMBER OF INCREMENTS.

ULTRAWIDE BANDWIDTH SYSTEM AND METHOD FOR FAST SYNCHRONIZATION USING MULTIPLE DETECTION ARMS

CROSS-REFERENCE TO RELATED PATENT DOCUMENTS

The present document contains subject matter related to that disclosed in commonly owned, co-pending application Ser. No. 09/209,460 filed Dec. 11, 1998, entitled ULTRA WIDE BANDWIDTH SPREAD-SPECTRUM COMMUNICATIONS SYSTEM; Ser. No. 09/633,815 filed Aug. 7, 2000, entitled ELECTRICALLY SMALL PLANAR UWB ANTENNA; application Ser. No. 09/563,292 filed May 3, 2000, entitled PLANAR ULTRA WIDE BAND ANTENNA WITH INTEGRATED ELECTRONICS now U.S. Pat. No. 6,351,246; Application Ser. No. 60/207,225 filed May 26, 2000, entitled ULTRAWIDEBAND COMMUNICATION SYSTEM AND METHOD; Application Ser. No. 09/685,198, filed Oct. 10, 2000, entitled ANALOG SIGNAL SEPARATOR FOR UWB VERSUS NARROWBAND SIGNALS; Application Ser. No. 60/238,466, filed Oct. 10, 2000, entitled ULTRA WIDE BANDWIDTH NOISE CANCELLATION MECHANISM AND METHOD; Application Ser. No. 60/217,099 filed Jul. 10, 2000, entitled MULTIMEDIA WIRELESS PERSONAL AREA NETWORK (WPAN) PHYSICAL LAYER SYSTEM AND METHOD; Application Ser. No. 09/685,203, filed Oct. 10, 2000, entitled SYSTEM AND METHOD FOR BASEBAND REMOVAL OF NARROWBAND INTERFERENCE IN ULTRA WIDEBAND SIGNALS now U.S. Pat. No. 6,834,073; Application Ser. No. 09/685,197, filed Oct. 10, 2000, entitled MODE CONTROLLER FOR SIGNAL ACQUISITION AND TRACKING IN AN ULTRA WIDEBAND COMMUNICATION SYSTEM now U.S. Pat. No. 6,965,630; Application Ser. No. 09/684,400, filed Oct. 10, 2000, entitled ULTRA WIDEBAND COMMUNICATION SYSTEM, METHOD, AND DEVICE WITH LOW NOISE PULSE FORMATION now U.S. Pat. No. 6,735,238; Application Ser. No. 09/685,195, filed Oct. 10, 2000, entitled ULTRA WIDE BANDWIDTH SYSTEM AND METHOD FOR FAST SYNCHRONIZATION now U.S. Pat. No. 6,925,108; Application Ser. No. 09/684,401, filed Oct. 10, 2000, entitled ULTRA WIDE BANDWIDTH SYSTEM AND METHOD FOR FAST SYNCHRONIZATION USING SUB CODE SPINS now U.S. Pat. No. 6,967,993; Application Ser. No. 09/685,199, filed Oct. 10, 2000, entitled A LOW POWER, HIGH RESOLUTION TIMING GENERATOR FOR ULTRA-WIDE BANDWIDTH COMMUNICATION SYSTEMS now U.S. Pat. No. 6,975,665; Application Ser. No. 09/685,202, filed Oct. 10, 2000, entitled METHOD AND SYSTEM FOR ENABLING DEVICE FUNCTIONS BASED ON DISTANCE INFORMATION; Application Ser. No. 09/685,201, filed Oct. 10, 2000, entitled CARRIERLESS ULTRA WIDEBAND WIRELESS SIGNALS FOR CONVEYING APPLICATION DATA now U.S. Pat. No. 6,505,032; Application Ser. No. 09/685,205, filed Oct. 10, 2000, entitled SYSTEM AND METHOD FOR GENERATING ULTRA WIDEBAND PULSES; Application Ser. No. 09/684,782, filed Oct. 10, 2000, entitled ULTRA WIDEBAND COMMUNICATION SYSTEM, METHOD, AND DEVICE WITH LOW NOISE RECEPTION now U.S. Pat. No. 6,859,506; and Application Ser. No. 09/685,200, filed Oct. 10, 2000, entitled LEAKAGE NULLING RECEIVER CORRELATOR STRUCTURE AND METHOD FOR ULTRA WIDE BANDWIDTH COMMUNICATION SYSTEM now U.S. Pat. No. 6,937,646; the entire contents of each of which being incorporated herein by reference.

BACKGROUND OF THE INVENTION

1. Field of the Invention

The present invention relates to radio frequency communication receivers, systems, and methods employing ultra-wide bandwidth (UWB) signaling techniques. More particularly, the present invention relates to receivers, systems, and methods configured to perform fast synchronization on an incoming signal at a receiver.

2. Discussion of the Background

In UWB communication systems, a transmitter embeds data in a signal that can propagate in a desired medium so that a receiver at a distant location can then extract information from the incoming signal. The transmitter clock and the receiver clock are usually not initially synchronized. However, in order to accurately extract the information from the incoming signal, the receiver clock should be synchronized with the incoming (received) signal. Fast synchronization is desirable because the faster the receiver is synchronized with the incoming signal, the faster the receiver achieves an acceptable quality of service, the higher the average throughput, and the lower the latency in the communicated data.

Many radios have some type of synchronization, also referred to as clock recovery, incorporated into the receiver. In narrowband communication systems, synchronization typically takes place by locking onto a carrier signal that is a narrowband tone, which can be isolated with a narrow band-pass filter. This form of operation (i.e. correlating with a sine wave via a narrowband filter) generally cannot be done in UWB systems because they are purposely designed not to emit any tones. Instead they send noise-like code sequences that appear like noise and mimic noise in standard narrowband receivers. As a result, synchronization is accomplished by correlating with the noise-like code sequence that was transmitted. Since a programmable real-time filter whose impulse response is a matched filter to the noise-like code sequence is difficult to build, a sliding correlator is typically used to acquire and track the signal. The sliding correlator is built by applying the noise-like sequence into a mixer/multiplier (e.g. the local oscillator LO port) and applying the received signal into the other port (i.e. the RF port), integrating the mixer output signal over the duration of the known noise code, and collecting a string of values comprised of the integration values. If the frequency of the clock used at the transmitter to encode the data does not precisely match the receiver clock frequency, then the two sequences (i.e. that applied to the RF port, and that provided to the LO port) at the receiver "slide" in phase (or time) relative to one another. At some point in time, the string of correlation values will peak to the largest absolute value, indicating that the two sequences are time (or phase) aligned. As they continue to slide in phase, a repeating pattern will result that is the cyclic autocorrelation function of the noise-like code sequence. Because the output of the sliding correlator is cyclic, the process of moving the phase of the receiver relative to the transmitter through one cycle is often referred to as a "code wheel spin." To guarantee that the largest absolute value of the correlation function is obtained, the code wheel must be allowed to spin at least one full cycle. In order to synchronize to the largest term, the receiver timing must have a mechanism to locate and then "lock onto" the largest peak by getting both the frequency and phase of its clock matched to the incoming signal. In the noiseless case, this mechanism can be simple and robust. But with real noise experienced by UWB receivers, the mechanism must be more complex and collect statistics in order to be robust.

Conventional UWB systems perform synchronization on an incoming signal modulated by pulse position modulation (PPM), where the temporal position of the pulses that constitute the incoming signal vary based on the data and the noise-like code sequence. Since the code sequence is long and spans many bits, and since the pulse repetition rate is slow (e.g. 10 MHz and lower), it takes a relatively long time to synchronize the receiver with the incoming signal.

UWB systems that use high chip rates (e.g. >1 GHz) to spread their spectrum, can cycle through a code of the same length much faster and thus synchronize faster. Nonetheless, the high sustained throughput requirements of newer applications such as streaming real-time video and multi-media in the context of multi-user networked systems gives rise to a need for faster synchronization so that more time is spent communicating data, and less time is spent synchronizing.

Most radios must operate in multipath environments. In multipath environments, more than one transmission path exists between the transmitter and receiver. Narrowband radios suffer in multipath environments due to the frequency selective nature of the phenomena. Narrowband radios can employ RAKE receiver structures to combine signals from the multiple paths, but this is a difficult and expensive process since narrowband systems lack the time-domain resolution to easily resolve the multipath terms.

By definition, UWB systems have high time-domain resolution, and thus can resolve the multipath signals. But the multipath signals lie within the modulation domain of UWB PPM systems, and the multipath environment can be unstable over the long coding periods of these systems.

High chip rate UWB systems have the advantage of operating in quasi-stationary multipath environments where the multipath is changing much slower than the code duration. In addition, UWB systems employing modulation schemes other than PPM do not as much difficulty with multipath corruption of the modulation. Such systems are better suited to cope with multipath environments.

The challenge, as recognized by the present inventors, is to perform fast synchronization so as to quickly obtain the best achievable signal quality, yet do it with high reliability and at a cost that is commensurate with extremely cost sensitive consumer electronics equipment.

SUMMARY OF THE INVENTION

Consistent with the title of this section, only a brief description of selected features of the present invention are presented. A more complete description of the present invention is the subject of this entire document.

An object of the present invention is to provide a method and a UWB receiver that includes a synchronization mechanism for synchronizing the receiver with an incoming signal in order to phase lock the incoming UWB signal.

Another object of the present invention is to provide a method and a UWB receiver that includes a fast synchronization mechanism for rapidly recognizing and synchronizing with an incoming signal.

Another object of the present invention is to address the above-identified and other deficiencies of conventional UWB communication systems and methods.

Another object of the present invention is to employ a RAKE receiver to lock on to multipath terms and thus increase the effective SNR of the receiver.

These and other objects are accomplished by way of a UWB receiver configured to receive UWB transmission schemes. An exemplary embodiment includes multiple detection arms employed to very rapidly achieve initial synchronization to likely sub-optimal phases and then converge to the optimal synchronization phases through use of scanning correlation arms. This embodiment will determine when an incoming signal has been synchronized with the receiver.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 14A–D describe and illustrate example vectors that contain elements corresponding to shifts in phase angle from an initial phase angle;

DESCRIPTION OF THE PREFERRED EMBODIMENTS

Figure 1A:
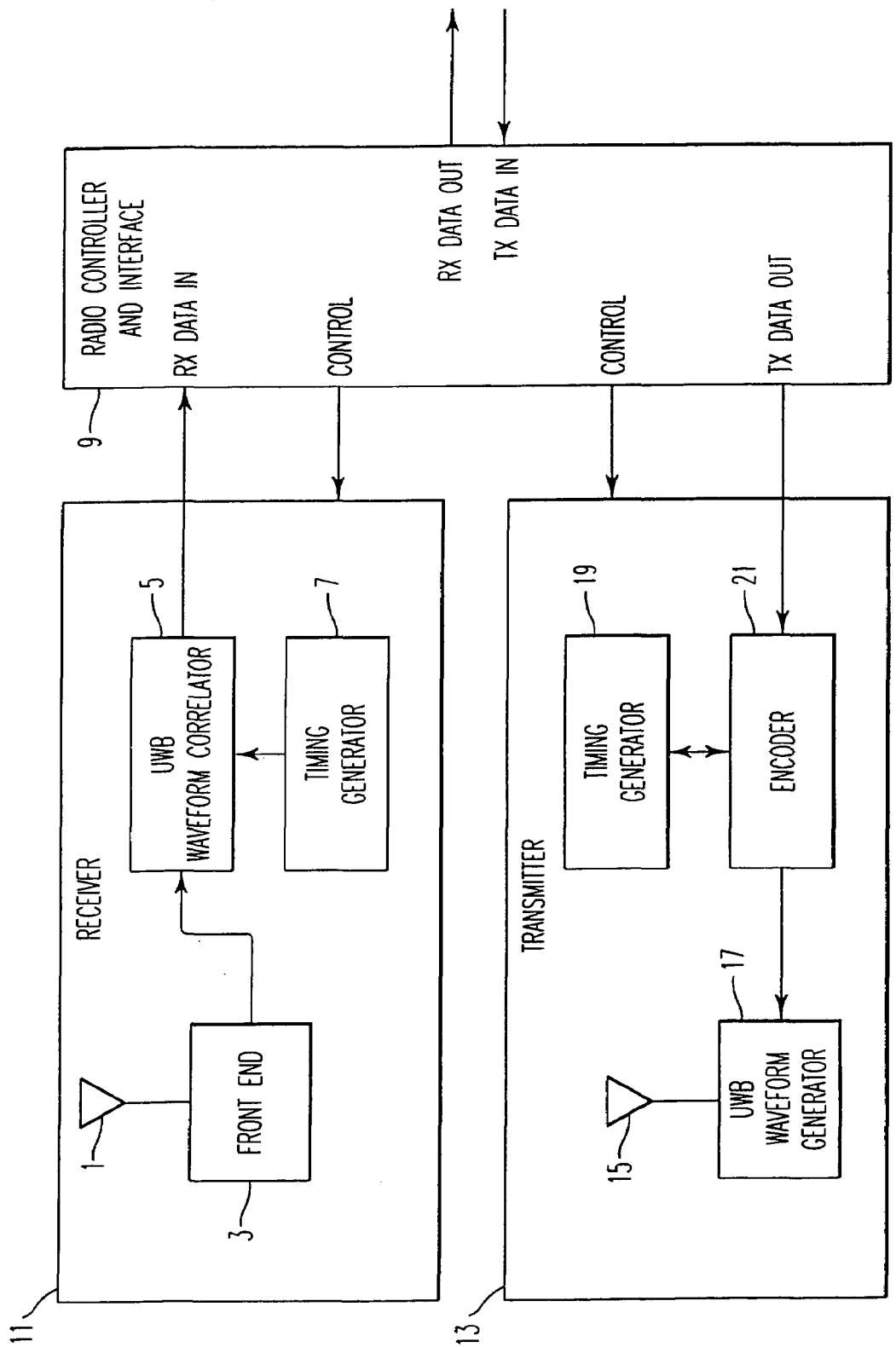
FIG. 1a is a block diagram of an ultra-wide band (UWB) transceiver, according to the present invention.

Referring now to the drawings, wherein like reference numerals designate identical or corresponding parts throughout the several views.

FIG. 1a is a block diagram of an ultra-wide band (UWB) transceiver. In FIG. 1a, the transceiver includes three major components, namely, receiver 11, radio controller and interface 9, and transmitter 13. Alternatively, the system may be implemented as a separate receiver 11 and radio controller and interface 9, and a separate transmitter 13 and radio controller and interface 9. The radio controller and interface 9 serves as a media access control (MAC) interface between the UWB wireless communication functions implemented by the receiver 11 and transmitter 13 and applications that use the UWB communications channel for exchanging data with remote devices.

The receiver 11 includes an antenna 1 that converts a UWB electromagnetic waveform into an electrical signal (or optical signal) for subsequent processing. The UWB signal is generated with a sequence of shape-modulated wavelets, where the occurrence times of the shape-modulated wavelets may also be modulated. For analog modulation, at least one of the shape control parameters is modulated with the analog signal. More typically, the wavelets take on M possible shapes. Digital information is encoded to use one or a combination of the M wavelet shapes and occurrence times to communicate information.

In one embodiment of the present invention, each wavelet communicates one bit, for example, using two shapes such as bi-phase. In other embodiments of the present invention, each wavelet may be configured to communicate nn bits, where $M \geq 2^{nn}$. For example, four shapes may be configured to communicate two bits, such as with quadrature phase or four-level amplitude modulation. In another embodiment of the present invention, each wavelet is a "chip" in a code sequence, where the sequence, as a group, communicates one or more bits. The code can be M-ary at the chip level, choosing from M possible shapes for each chip.

At the chip, or wavelet level, embodiments of the present invention produce UWB waveforms. The UWB waveforms are modulated by a variety of techniques including but not limited to: (i) bi-phase modulated signals (+1, −1), (ii) multilevel bi-phase signals (+1, −1, +a1, −a1, +a2, −a2, . . . , +aN, −aN), (iii) quadrature phase signals (+1, −1, +j, −j), (iv) multi-phase signals (1, −1, exp(+jπ/N), exp(−jπ/N), exp(+jπ2/N), exp(−jπ2/N), . . . , exp(+j(N−1)/N), exp(−jπ(N−1)/N)), (v) multilevel multi-phase signals ($a_i$, exp(j2πβ/N)|$a_i \in \{1, a1, a2, \ldots, aK\}$, $\beta \in \{0, 1, \ldots, N-1\}$), (vi) frequency modulated pulses, (vii) pulse position modulation (PPM) signals (possibly same shape pulse transmitted in different candidate time slots), (viii) M-ary modulated waveforms $g_{B_i}(t)$ with $B_i \in \{1, \ldots, M\}$, and (ix) any combination of the above waveforms, such as multi-phase channel symbols transmitted according to a chirping signaling scheme. The present invention, however, is applicable to variations of the above modulation schemes and other modulation schemes (e.g., as described in Lathi, "Modern Digital and Analog Communications Systems," Holt, Rinehart and Winston, 1998, the entire contents of which is incorporated by reference herein), as will be appreciated by those skilled in the relevant art(s).

Some exemplary waveforms and characteristic equations thereof will now be described. The time modulation component, for example, can be defined as follows. Let $t_i$ be the time spacing between the $(i-1)^{th}$ pulse and the $i^{th}$ pulse. Accordingly, the total time to the $i^{th}$ pulse is $$T_i = \sum_{j=0}^{i} t_j.$$

The signal $T_i$ could be encoded for data, part of a spreading code or user code, or some combination thereof. For example, the signal $T_i$ could be equally spaced, or part of a spreading code, where $T_i$ corresponds to the zero-crossings of a chirp, i.e., the sequence of $T_i$'s, and where $$T_i = \sqrt{\frac{i-a}{k}}$$

for a predetermined set of a and k. Here, a and k may also be chosen from a finite set based on the user code or encoded data.

An embodiment of the present invention can be described using M-ary modulation. Equation 1 below can be used to represent a sequence of exemplary transmitted or received pulses, where each pulse is a shape modulated UWB wavelet, $g_{B_i}(t-T_i)$.

$$x(t) = \sum_{i=0}^{\infty} g_{B_i}(t - T_i) \tag{1}$$

In the above equation, the subscript i refers to the $i^{th}$ pulse in the sequence of UWB pulses transmitted or received. The wavelet function g has M possible shapes, and therefore $B_i$ represents a mapping from the data, to one of the M-ary modulation shapes at the $i^{th}$ pulse in the sequence. The wavelet generator hardware (e.g., the UWB waveform generator 17) has several control lines (e.g., coming from the radio controller and interface 9) that govern the shape of the wavelet. Therefore, $B_i$ can be thought of as including a lookup-table for the M combinations of control signals that produce the M desired wavelet shapes. The encoder 21 combines the data stream and codes to generate the M-ary states. Demodulation occurs in the waveform correlator 5 and the radio controller and interface 9 to recover to the original data stream. Time position and wavelet shape are combined into the pulse sequence to convey information, implement user codes, etc.

In the above case, the signal is comprised of wavelets from i=1 to infinity. As i is incremented, a wavelet is produced. Equation 2 below can be used to represent a generic wavelet pulse function, whose shape can be changed from pulse to pulse to convey information or implement user codes, etc.

$$g_{B_i}(t) = Re(B_{i,1}) \cdot f_{B_{i,2},B_{i,3}, \ldots}(t) + Im(B_{i,1}) \cdot h_{B_{i,2},B_{i,3}, \ldots}(t) \tag{2}$$

In the above equation, function $f$ defines a basic wavelet shape, and function h is simply the Hilbert transform of the function $f$. The parameter $B_{i,1}$ is a complex number allowing the magnitude and phase of each wavelet pulse to be adjusted, i.e., $B_{i,1}=a_i\phi\theta_i$, where $a_1$ is selected from a finite set of amplitudes and $\theta_i$ is selected from a finite set of phases. The parameters $\{B_{i,2}, B_{i,3}, \ldots\}$ represent a generic group of parameters that control the wavelet shape.

An exemplary waveform sequence x(t) can be based on a family of wavelet pulse shapes $f$ that are derivatives of a Guassian waveform as defined by Equation 3 below.

$$f_{B_i} = \Psi(B_{i,2}, B_{i,3})\left(\frac{d^{B_{i,3}}}{dt^{B_{i,3}}}e^{-[B_{i,2}t]^2}\right) \quad (3)$$

In the above equation, the function $\Psi()$ normalizes the peak absolute value of $f_{B_i}(t)$ to 1. The parameter $B_{i,2}$ controls the pulse duration and center frequency. The parameter $B_{i,3}$ is the number of derivatives and controls the bandwidth and center frequency.

Another exemplary waveform sequence x(t) can be based on a family of wavelet pulse shapes $f$ that are Gaussian weighted sinusoidal functions, as described by Equation 4 below.

$$f_{B_{i,2},B_{i,3},B_{1,4}}=f_{\omega_i,k_i,b_i}(t)=e^{-[b_it]^2}\sin(\omega_it+k_it). \quad (4)$$

In the above equation, $b_i$ controls the pulse duration, $\omega_i$ controls the center frequency, and $k_i$ controls a chirp rate. Other exemplary weighting functions, beside Gaussian, that are also applicable to the present invention include, for example, Rectangular, Hanning, Hamming, Blackman-Harris, Nutall, Taylor, Kaiser, Chebychev, etc.

Another exemplary waveform sequence x(t) can be based on a family of wavelet pulse shapes $f$ that are inverse-exponentially weighted sinusoidal functions, as described by Equation 5 below.

$$g_{B_i}(t) = \left(\frac{1}{e^{\frac{-(t-t1_i)}{.3*tr_i}}+1} - \frac{1}{e^{\frac{-(t-t2_i)}{.3*tf_i}}+1}\right) \cdot \sin(\theta_i + \omega_it + k_it^2) \quad (5)$$

where $\{B_{i,2},B_{i,3},B_{i,4},B_{i,5},B_{i,6},B_{i,7},B_{i,8}\}=\{t1_i,t2_i,tr_i,tf_i,\theta_i,\omega_i,k_i\}$ In the above equation, the leading edge turn on time is controlled by t1, and the turn-on rate is controlled by tr. The trailing edge turn-off time is controlled by t2, and the turn-off rate is controlled by tf. Assuming the chirp starts at t=0 and $T_D$ is the pulse duration, the starting phase is controlled by $\theta$, the starting frequency is controlled by $\omega$, the chirp rate is controlled by k, and the stopping frequency is controlled by $+kT_D$. An example assignment of parameter values is=1, tr=tf=0.25, t1=tr/0.51, and t2=$T_D$-tr/9.

A feature of the present invention is that the M-ary parameter set used to control the wavelet shape is chosen so as to make a UWB signal, wherein the center frequency $f_c$ and the bandwidth B of the power spectrum of g(t) satisfies $2f_c>B>0.25f_c$. It should be noted that conventional equations define in-phase and quadrature signals (e.g., often referred to as I and Q) as sine and cosine terms. An important observation, however, is that this conventional definition is inadequate for UWB signals. The present invention recognizes that use of such conventional definition may lead to DC offset problems and inferior performance.

Furthermore, such inadequacies get progressively worse as the bandwidth moves away from $0.25f_c$ and toward $2f_c$. A key attribute of the exemplary wavelets (or e.g., those described in co-pending U.S. patent application Ser. No. 09/209,460) is that the parameters are chosen such that neither $f$ nor h in Equation 2 above has a DC component, yet $f$ and h exhibit the required wide relative bandwidth for UWB systems.

Similarly, as a result of $B>0.25f_c$, it should be noted that the matched filter output of the UWB signal is typically only a few cycles, or even a single cycle. For example, the parameter n in Equation 3 above may only take on low values (e.g., such as those described in co-pending U.S. patent application Ser. No. 09/209,460).

Figure 1B:
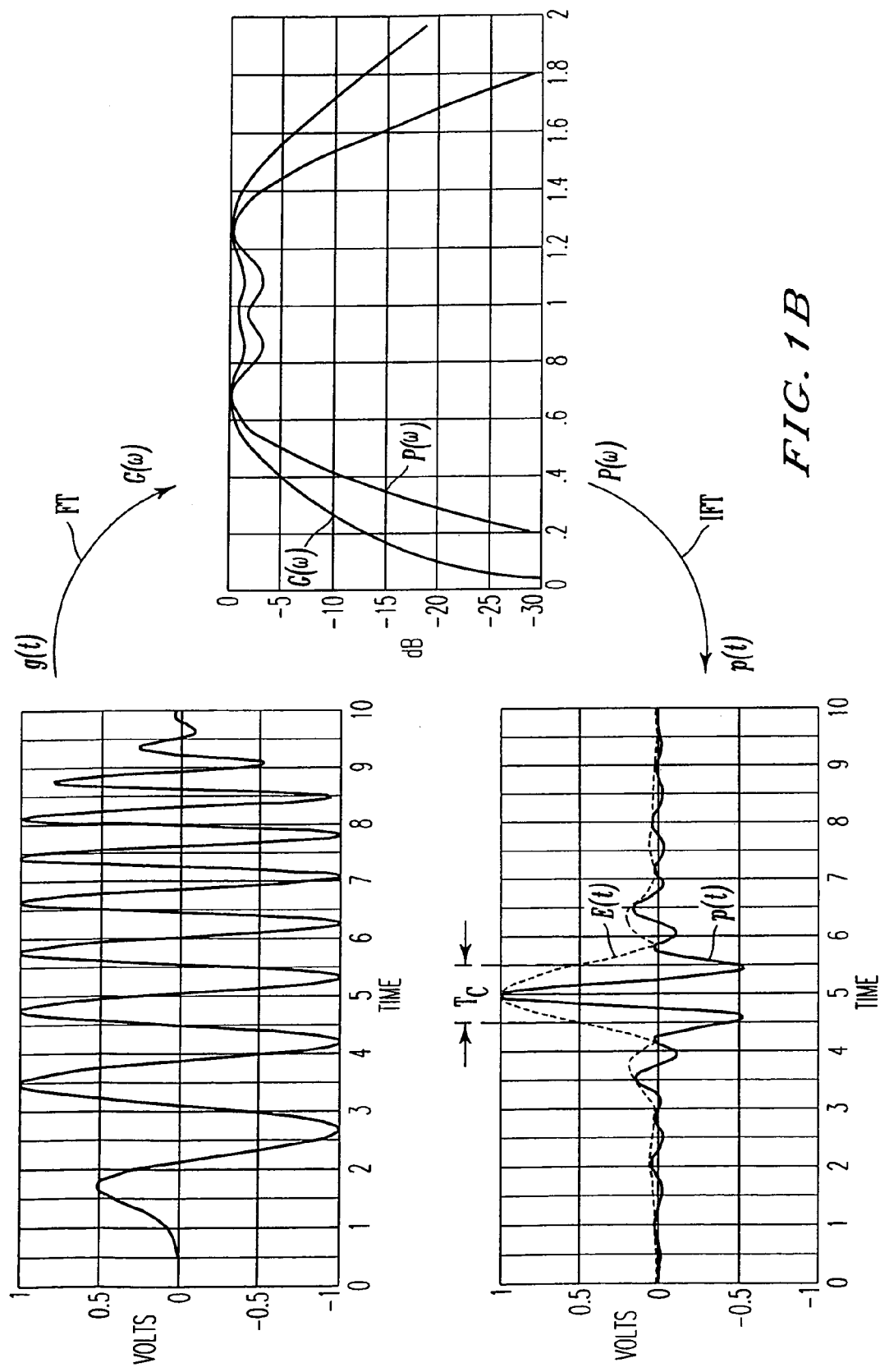
FIG. 1b is a diagram for illustrating the operation of the transceiver of FIG. 1a, according to the present invention.

The compressed (i.e., coherent matched filtered) pulse width of a UWB wavelet will now be defined with reference to FIG. 1b. In FIG. 1b, the time domain version of the wavelet thus represents g(t) and the Fourier transform (FT) version is represented by G($\omega$). Accordingly, the matched filter is represented as G*($\omega$), the complex conjugate, so that the output of the matched filter is P($\omega$)=G($\omega$)·G*($\omega$). The output of the matched filter in the time domain is seen by performing an inverse Fourier transform (IFT) on P($\omega$) so as to obtain p(t), the compressed or matched filtered pulse. The width of the compressed pulse p(t) is defined by $T_C$, which is the time between the points on the envelope of the compressed pulse E(t) that are 6 dB below the peak thereof, as shown in FIG. 1b. The envelope waveform E(t) may be determined by Equation 6 below.

$$E(t)=\sqrt{(p(t))^2+(p^H(t))^2} \quad (6)$$

where $p^H(t)$ is the Hilbert transform of p(t).

Accordingly, the above-noted parameterized waveforms are examples of UWB wavelet functions that can be controlled to communicate information with a large parameter space for making codes with good resulting autocorrelation and cross-correlation functions. For digital modulation, each of the parameters is chosen from a predetermined list according to an encoder that receives the digital data to be communicated. For analog modulation, at least one parameter is changed dynamically according to some function (e.g., proportionally) of the analog signal that is to be communicated.

Referring back to FIG. 1a, the electrical signals coupled in through the antenna 1 are passed to a radio front end 3. Depending on the type of waveform, the radio front end 3 processes the electric signals so that the level of the signal and spectral components of the signal are suitable for processing in the UWB waveform correlator 5. The UWB waveform correlator 5 correlates the incoming signal (e.g., as modified by any spectral shaping, such as a matched filtering, partially matched filtering, simply roll-off, etc., accomplished in front end 3) with different candidate signals generated by the receiver 11, so as to determine when the receiver 11 is synchronized with the received signal and to determine the data that was transmitted.

The timing generator 7 of the receiver 11 operates under control of the radio controller and interface 9 to provide a clock signal that is used in the correlation process performed in the UWB waveform correlator 5. Moreover, in the receiver 11, the UWB waveform correlator 5 correlates in time a particular pulse sequence produced at the receiver 11 with the receive pulse sequence that was coupled in through antenna 1 and modified by front end 3. When the two such sequences are aligned with one another, the UWB waveform correlator 5 provides high signal to noise ratio (SNR) data to the radio controller and interface 9 for subsequent processing. In some circumstances, the output of the UWB waveform correlator 5 is the data itself. In other circumstances, the UWB waveform correlator 5 simply provides an intermediate correlation result, which the radio controller and interface 9 uses to determine the data and determine when the receiver 11 is synchronized with the incoming signal.

In some embodiments of the present invention, when synchronization is not achieved (e.g., during a signal acquisition mode of operation), the radio controller and interface 9 provides a control signal to the receiver 11 to acquire synchronization. In this way, a sliding of a correlation window within the UWB waveform correlator 5 is possible by adjustment of the phase and frequency of the output of the timing generator 7 of the receiver 11 via a control signal from the radio controller and interface 9. The control signal causes the correlation window to slide until lock is achieved. The radio controller and interface 9 is a processor-based unit that is implemented either with hard wired logic, such as in one or more application specific integrated circuits (ASICs) or in one or more programmable processors.

Once synchronized, the receiver 11 provides data to an input port ("RX Data In") of the radio controller and interface 9. An external process, via an output port ("RX Data Out") of the radio controller and interface 9, may then use this data. The external process may be any one of a number of processes performed with data that is either received via the receiver 11 or is to be transmitted via the transmitter 13 to a remote receiver.

During a transmit mode of operation, the radio controller and interface 9 receives source data at an input port ("TX Data In") from an external source. The radio controller and interface 9 then applies the data to an encoder 21 of the transmitter 13 via an output port ("TX Data Out"). In addition, the radio controller and interface 9 provides control signals to the transmitter 13 for use in identifying the signaling sequence of UWB pulses. In some embodiments of the present invention, the receiver 11 and the transmitter 13 functions may use joint resources, such as a common timing generator and/or a common antenna, for example. The encoder 21 receives user coding information and data from the radio controller and interface 9 and preprocesses the data and coding so as to provide a timing input for the UWB waveform generator 17, which produces UWB pulses encoded in shape and/or time to convey the data to a remote location.

The encoder 21 produces the control signals necessary to generate the required modulation. For example, the encoder 21 may take a serial bit stream and encode it with a forward error correction (FEC) algorithm (e.g., such as a Reed Solomon code, a Golay code, a Hamming code, a Convolutional code, etc.). The encoder 21 may also interleave the data to guard against burst errors. The encoder 21 may also apply a whitening function to prevent long strings of "ones" or "zeros." The encoder 21 may also apply a user specific spectrum spreading function, such as generating a predetermined length chipping code that is sent as a group to represent a bit (e.g., inverted for a "one" bit and non-inverted for a "zero" bit, etc.). The encoder 21 may divide the serial bit stream into subsets in order to send multiple bits per wavelet or per chipping code, and generate a plurality of control signals in order to affect any combination of the modulation schemes as described above (and/or as described in Lathi).

The radio controller and interface 9 may provide some identification, such as user ID, etc., of the source from which the data on the input port ("TX Data In") is received. In one embodiment of the present invention, this user ID may be inserted in the transmission sequence, as if it were a header of an information packet. In other embodiments of the present invention, the user ID itself may be employed to encode the data, such that a receiver receiving the transmission would need to postulate or have a priori knowledge of the user ID in order to make sense of the data. For example, the ID may be used to apply a different amplitude signal (e.g., of amplitude "f") to a fast modulation control signal to be discussed with respect to FIG. 2, as a way of impressing the encoding onto the signal.

The output from the encoder 21 is applied to a UWB waveform generator 17. The UWB waveform generator 17 produces a UWB pulse sequence of pulse shapes at pulse times according to the command signals it receives, which may be one of any number of different schemes. The output from the UWB generator 17 is then provided to an antenna 15, which then transmits the UWB energy to a receiver.

In one UWB modulation scheme, the data may be encoded by using the relative spacing of transmission pulses (e.g., PPM, chirp, etc.). In other UWB modulation schemes, the data may be encoded by exploiting the shape of the pulses as described above (and/or as described in Lathi). It should be noted that the present invention is able to combine time modulation (e.g., such as pulse position modulation, chirp, etc.) with other modulation schemes that manipulate the shape of the pulses.

There are numerous advantages to the above capability, such as communicating more than one data bit per symbol transmitted from the transmitter 13, etc. An often even more important quality, however, is the application of such technique to implement spread-spectrum, multi-user systems, which require multiple spreading codes (e.g., such as each with spike autocorrelation functions, and jointly with low peak cross-correlation functions, etc.).

In addition, combining timing, phase, frequency, and amplitude modulation adds extra degrees of freedom to the spreading code functions, allowing greater optimization of the cross-correlation and autocorrelation characteristics. As a result of the improved autocorrelation and cross-correlation characteristics, the system according to the present invention has improved capability, allowing many transceiver units to operate in close proximity without suffering from interference from one another.

Figure 2:
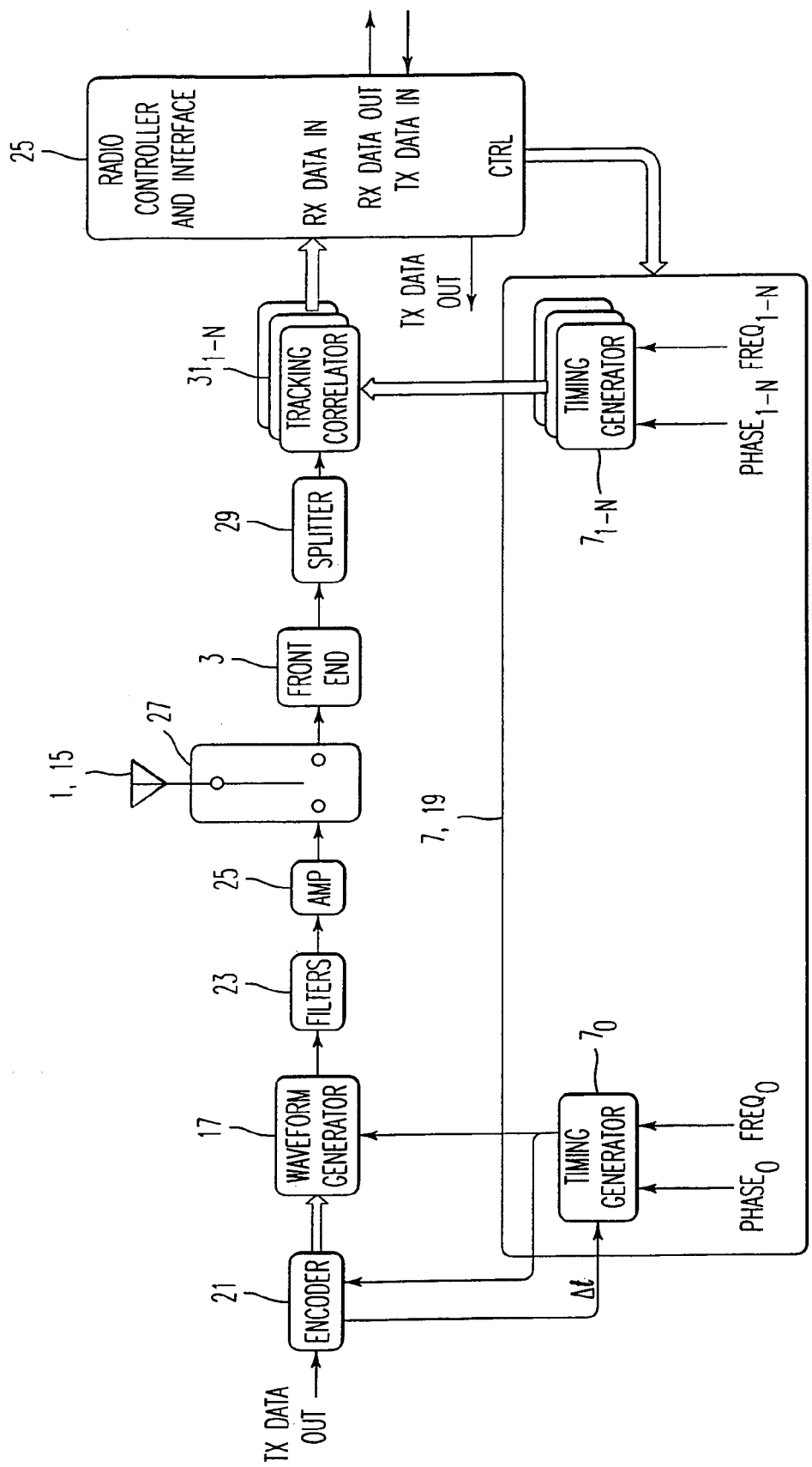
FIG. 2 is a block diagram of the transceiver of FIG. 1a, that manipulates a shape of UWB pulses, according to the present invention.

FIG. 2 is a block diagram of a transceiver embodiment of the present invention in which the modulation scheme employed is able to manipulate the shape and time of the UWB pulses. In FIG. 2, when receiving energy through the antenna 1, 15 (e.g., corresponding antennas 1 and 15 of FIG. 1a) the energy is coupled in to a transmit/receive (T/R) switch 27, which passes the energy to a radio front end 3. The radio front end 3 filters, extracts noise, and adjusts the amplitude of the signal before providing the same to a splitter 29. The splitter 29 divides the signal up into one of N different signals and applies the N different signals to different tracking correlators $31_1$–$31_N$. Each of the tracking correlators $31_1$–$31_N$ receives a clock input signal from a respective timing generator $7_1$–$7_N$ of a timing generator module 7, 19, as shown in FIG. 2.

The timing generators $7_1$–$7_N$ for example, receive a phase and frequency adjustment signal, as shown in FIG. 2, but may also receive a fast modulation signal or other control signal(s) as well. The radio controller and interface 9 provides the control signals, such as phase, frequency and fast modulation signals, etc., to the timing generator module 7, 19, for time synchronization and modulation control. The fast modulation control signal may be used to implement, for example, chirp waveforms, PPM waveforms, such as fast time scale PPM waveforms, etc.

The radio controller and interface 9 also provides control signals to, for example, the encoder 21, the waveform generator 17, the filters 23, the amplifier 25, the T/R switch 27, the front end 3, the tracking correlators $31_1$–$31_N$ (corresponding to the UWB waveform correlator 5 of FIG. 1a), etc., for controlling, for example, amplifier gains, signal waveforms, filter passbands and notch functions, alternative demodulation and detecting processes, user codes, spreading codes, cover codes, etc.

During signal acquisition, the radio controller and interface 9 adjusts the phase input of, for example, the timing generator $7_1$, in an attempt for the tracking correlator $31_1$ to identify and the match the timing of the signal produced at the receiver with the timing of the arriving signal. When the received signal and the locally generated signal coincide in time with one another, the radio controller and interface 9 senses the high signal strength or high SNR and begins to track, so that the receiver is synchronized with the received signal.

Once synchronized, the receiver will operate in a tracking mode, where the timing generator $7_1$ is adjusted by way of a continuing series of phase adjustments to counteract any differences in timing of the timing generator $7_1$ and the incoming signal. However, a feature of the present invention is that by sensing the mean of the phase adjustments over a known period of time, the radio controller and interface 9 adjusts the frequency of the timing generator $7_1$ so that the mean of the phase adjustments becomes zero. The frequency is adjusted in this instance because it is clear from the pattern of phase adjustments that there is a frequency offset between the timing generator $7_1$ and the clocking of the received signal. Similar operations may be performed on timing generators $7_2$–$7_N$, so that each receiver can recover the signal delayed by different amounts, such as the delays caused by multipath (i.e., scattering along different paths via reflecting off of local objects).

A feature of the transceiver in FIG. 2 is that it includes a plurality of tracking correlators $31_1$–$31_N$. By providing a plurality of tracking correlators, several advantages are obtained. First, it is possible to achieve synchronization more quickly (i.e., by operating parallel sets of correlation arms to find strong SNR points over different code-wheel segments). Second, during a receive mode of operation, the multiple arms can resolve and lock onto different multipath components of a signal. Through coherent addition, the UWB communication system uses the energy from the different multipath signal components to reinforce the received signal, thereby improving signal to noise ratio. Third, by providing a plurality of tracking correlator arms, it is also possible to use one arm to continuously scan the channel for a better signal than is being received on other arms.

In one embodiment of the present invention, if and when the scanning arm finds a multipath term with higher SNR than another arm that is being used to demodulate data, the role of the arms is switched (i.e., the arm with the higher SNR is used to demodulate data, while the arm with the lower SNR begins searching). In this way, the communications system dynamically adapts to changing channel conditions.

The radio controller and interface 9 receives the information from the different tracking correlators $31_1$–$31_N$ and decodes the data. The radio controller and interface 9 also provides control signals for controlling the front end 3, e.g., such as gain, filter selection, filter adaptation, etc., and adjusting the synchronization and tracking operations by way of the timing generator module 7, 19.

In addition, the radio controller and interface 9 serves as an interface between the communication link feature of the present invention and other higher level applications that will use the wireless UWB communication link for performing other functions. Some of these functions would include, for example, performing range-finding operations, wireless telephony, file sharing, personal digital assistant (PDA) functions, embedded control functions, location-finding operations, etc.

On the transmit portion of the transceiver shown in FIG. 2, a timing generator $7_0$ also receives phase, frequency and/or fast modulation adjustment signals for use in encoding a UWB waveform from the radio controller and interface 9. Data and user codes (via a control signal) are provided to the encoder 21, which in the case of an embodiment of the present invention utilizing time-modulation, passes command signals (e.g., $\Delta t$) to the timing generator $7_0$ for providing the time at which to send a pulse. In this way, encoding of the data into the transmitted waveform may be performed.

When the shape of the different pulses are modulated according to the data and/or codes, the encoder 21 produces the command signals as a way to select different shapes for generating particular waveforms in the waveform generator 17. For example, the data may be grouped in multiple data bits per channel symbol. The waveform generator 17 then produces the requested waveform at a particular time as indicated by the timing generator $7_0$. The output of the waveform generator is then filtered in filter 23 and amplified in amplifier 25 before being transmitted via antenna 1, 15 by way of the T/R switch 27.

In another embodiment of the present invention, the transmit power is set low enough that the transmitter and receiver are simply alternately powered down without need for the T/R switch 27. Also, in some embodiments of the present invention, neither the filter 23 nor the amplifier 25 is needed, because the desired power level and spectrum is directly useable from the waveform generator 17. In addition, the filters 23 and the amplifier 25 may be included in the waveform generator 17 depending on the implementation of the present invention.

A feature of the UWB communications system disclosed, is that the transmitted waveform x(t) can be made to have a nearly continuous power flow, for example, by using a high chipping rate, where the wavelets g(t) are placed nearly back-to-back. This configuration allows the system to operate at low peak voltages, yet produce ample average transmit power to operate effectively. As a result, sub-micron geometry CMOS switches, for example, running at one-volt levels, can be used to directly drive antenna 1, 15, such that the amplifier 25 is not required. In this way, the entire radio can be integrated on a single monolithic integrated circuit.

Under certain operating conditions, the system can be operated without the filters 23. If, however, the system is to be operated, for example, with another radio system, the filters 23 can be used to provide a notch function to limit interference with other radio systems. In this way, the system can operate simultaneously with other radio systems, providing advantages over conventional devices that use avalanching type devices connected straight to an antenna, such that it is difficult to include filters therein.

Figure 3:
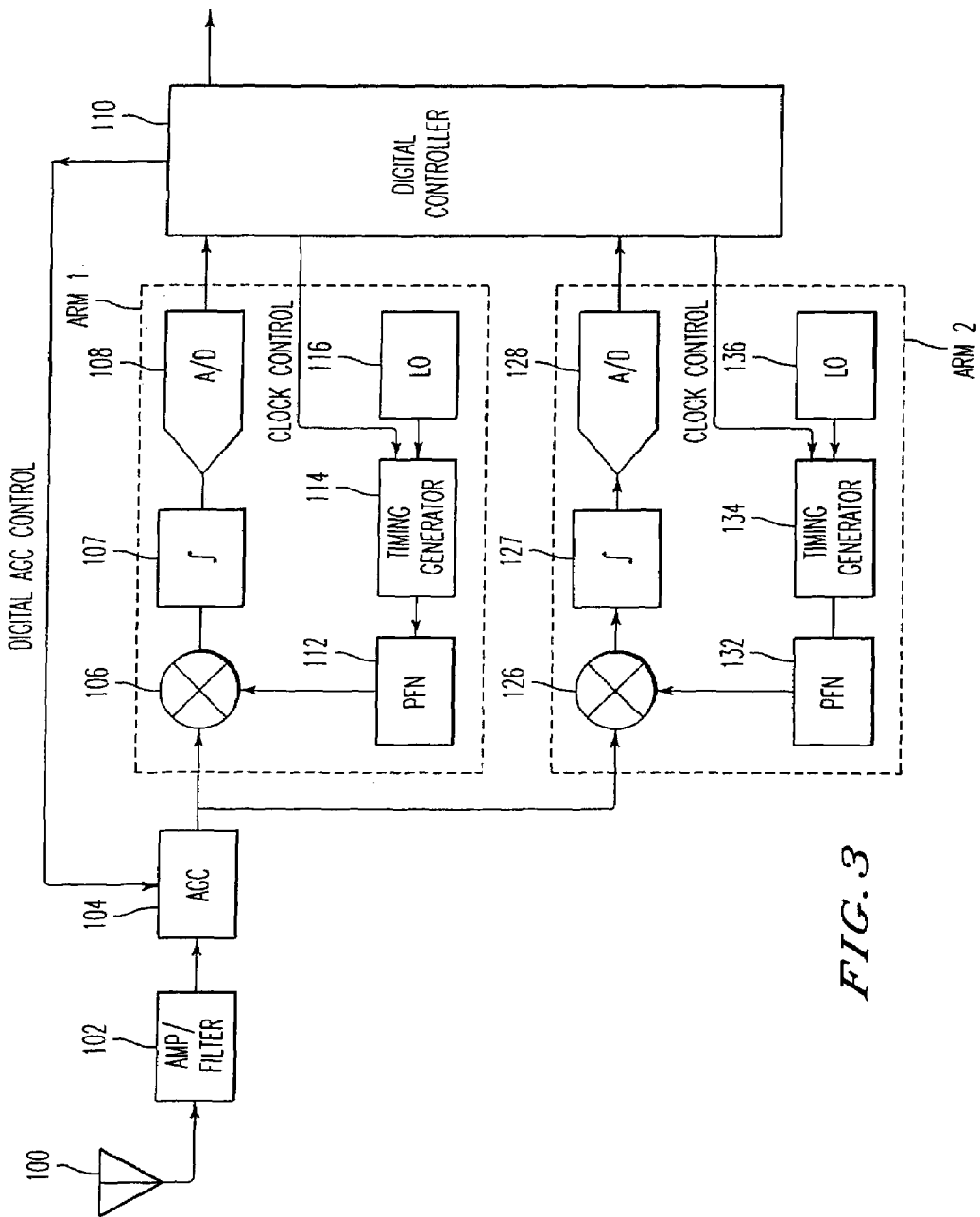
FIG. 3 is a block diagram of an exemplary UWB receiver of the present invention.

FIG. 3 shows a particular embodiment of a UWB receiver employed according to the present invention, in which multiple arms are used to synchronize an incoming signal at the receiver. In this embodiment, two arms are used. However, additional arms may also be used to synchronize the incoming signal. In this example, amplifier 102 is disposed in the front end 3 of FIG. 1a, mixer 106, integrator 107, and PFN 112 are disposed in UWB waveform correlator 5 of FIG. 1a, local oscillator 116 and timing generator 114 are disposed in the timing generator 7 of FIG. 1a, and A/D converter 108 and digital controller 110 may be included in radio controller and interface 9 of FIG. 1a. In an exemplary UWB receiver of the present invention, an electromagnetic signal is transmitted over a radio channel to be received in the UWB receiver at antenna 100. After passing through antenna 100 and being converted into an electrical signal, the signal is amplified at amplifier 102. The incoming signal is then normalized to fall within a particular dynamic range via AGC (automatic gain control, such as a variable attenuator) 104 to produce an acceptable signal level. At PFN 112, a series of local pulses (e.g., square pulses or perhaps wavelets) are generated and multiplied with the incoming signal at mixer 106. Integrator 107 accumulates the mixer output over a predetermined period. The output is sampled at A/D converter 108 at a rate that corresponds to a source bit rate, such that there are a predetermined number of samples per bit, such as one sample per bit. The output of A/D converter 108 is provided to digital controller 110, where synchronization mode control is performed. The digital controller sends a control signal back to timing generator 114 as part of the synchronization process. The timing generator 114 acts in conjunction with local oscillator 116 to adjust the phase of the local pulse mixed with the incoming signal in mixer 106. PFN 112 sends a reset command to integrator 107 for each bit (if that is the selected accumulate period). PFN 112 also sends a clock command to A/D converter 108 to sample the output of integrator 107. Digital controller 110 monitors the strength of the signal from A/D converter 108 and sends instructions to AGC 104 to adjust the gain. A mode controller in digital controller 110 determines if the receiver should be in acquisition or tracking mode based on the signal-to-noise ratio (SNR). Digital controller 110 sends a clock control signal back to the timing generator 114 as part of the synchronization process. If the SNR is less than a predetermined amount, the control signal adjusts the phase and/or frequency of the timing generator in an attempt to synchronize to, or accurately track the received signal. If the output signal quality from integrator 107 is consistently below a predetermined threshold, the mode controller places the system into acquisition mode, and digital controller 110 sends a signal to timing generator 114 to adjust the phase of the generated local pulse stream. The local pulse stream slides in phase until it is aligned in time with the incoming signal at mixer 106, hence, obtaining maximum correlation magnitude. The point at which maximum correlation occurs is determined by any of a variety of acquisition routines, as will be discussed. The local oscillator 116 provides a reference signal to the timing generator 114, which in turn provides a timing signal to the PFN 112 that produces a locally generated pulse stream that is mixed with the incoming signal at mixer 106.

Arm 2 performs similarly using a mixer 126, an integrator 127, an A/D converter 128, a PFN 132, a timing generator 134, and a local oscillator 136.

Figure 4A:
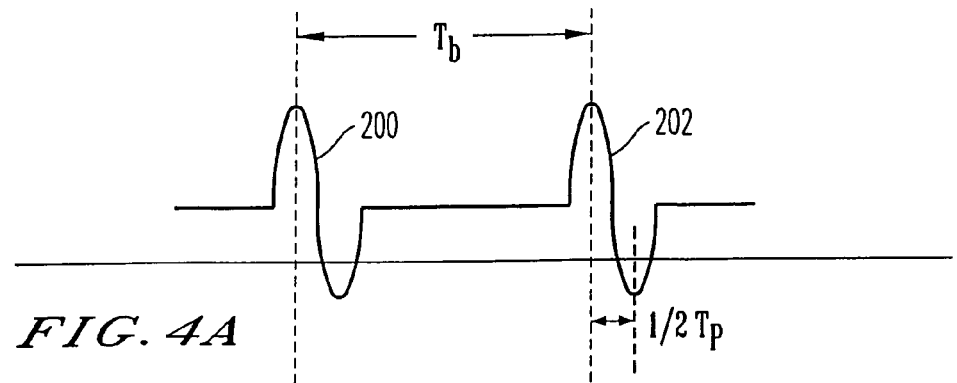
FIGS. 4A–C show a signal flow diagram of an incoming signal, a local pulse created at the receiver, and the correlation function of the incoming signal and the local pulse according to one embodiment of the present invention.
Figure 4B:
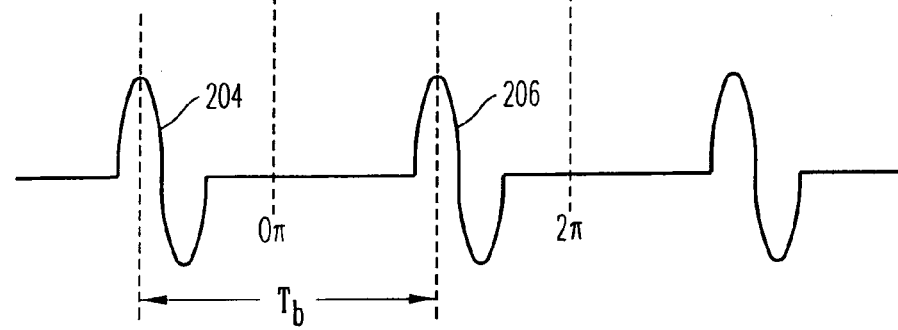
Figure 4C:
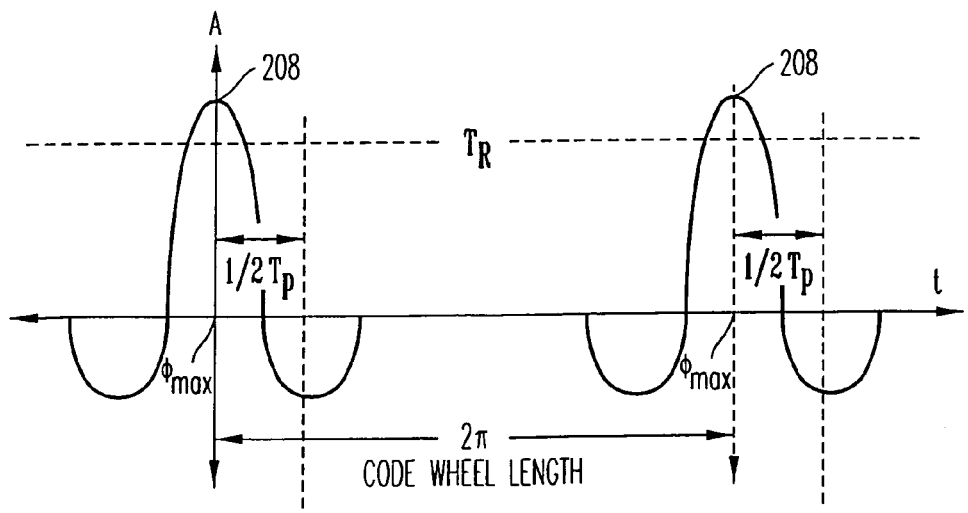

FIGS. 4A–4C show the signal flow diagram of the incoming signal, the local pulses created by PFN 112, and the resulting correlation function of the incoming signal with the local pulse for Arm 1 according to the present invention. (Arm 2 performs the same way.) In FIG. 4A, incoming pulses 200 and 202 arrive at some fixed clock interval called $T_b$. $T_b$ is 10 nanoseconds, for example. In FIG. 4B, the locally generated pulses 204 and 206 are similar to the incoming pulses. There is maximum correlation at mixer 106 when the two signals are perfectly phase aligned. Initially, it is not known whether the two signals are aligned (synchronized) with each other. Thus, the local pulses created in PFN 112 may be positioned between the pulses of the incoming signal as shown in FIGS. 4A and 4B. As a result, the output of mixer 106 is zero since the product of the incoming pulse train and the locally generated pulse train is zero. In other words, the signals cancel each other out. So, in order to maximize correlation, the phase of timing generator 114 attached to PFN 112 is varied and then set by the clock control signal coming from digital controller 110 to generate pulses that are in phase with the incoming signal at mixer 106. At digital controller 110, if the output from mixer 106 is not maximized, then digital controller 110 sends a signal to timing generator 114 to adjust the phase of the locally generated pulses. To do this, the phase of local oscillator 116 is adjusted to create pulses in phase with the incoming signal. As such, the local pulses slide in phase until they are aligned (synchronized) with the incoming pulse train at mixer 106 and hence maximum correlation is achieved.

FIG. 4C shows the correlation of the incoming signal with the locally generated pulses as a function of time (or phase, since the phase is scanned), as well as an illustrative exemplary magnitude threshold TR that can be used to identify specific portions of the correlation function. As can be seen at point 208, when the signals are phase aligned, cross-correlation is at a maximum. Furthermore, point 208 along with neighboring portions of the correlation are above exemplary magnitude threshold $T_R$, provided that the amplitude of the received signal is sufficiently high. Essentially, the cross-correlation function is examined over a given time (or phase) until the portions of the correlation above exemplary magnitude threshold $T_R$ are found. At the portions of the correlation above exemplary magnitude threshold $T_R$, the receiver can then be considered synchronized to the incoming signal. Alternatively, any parameter related to signal-to-noise ratio (SNR) may be compared to the threshold to determine synchronization.

Figure 4D:
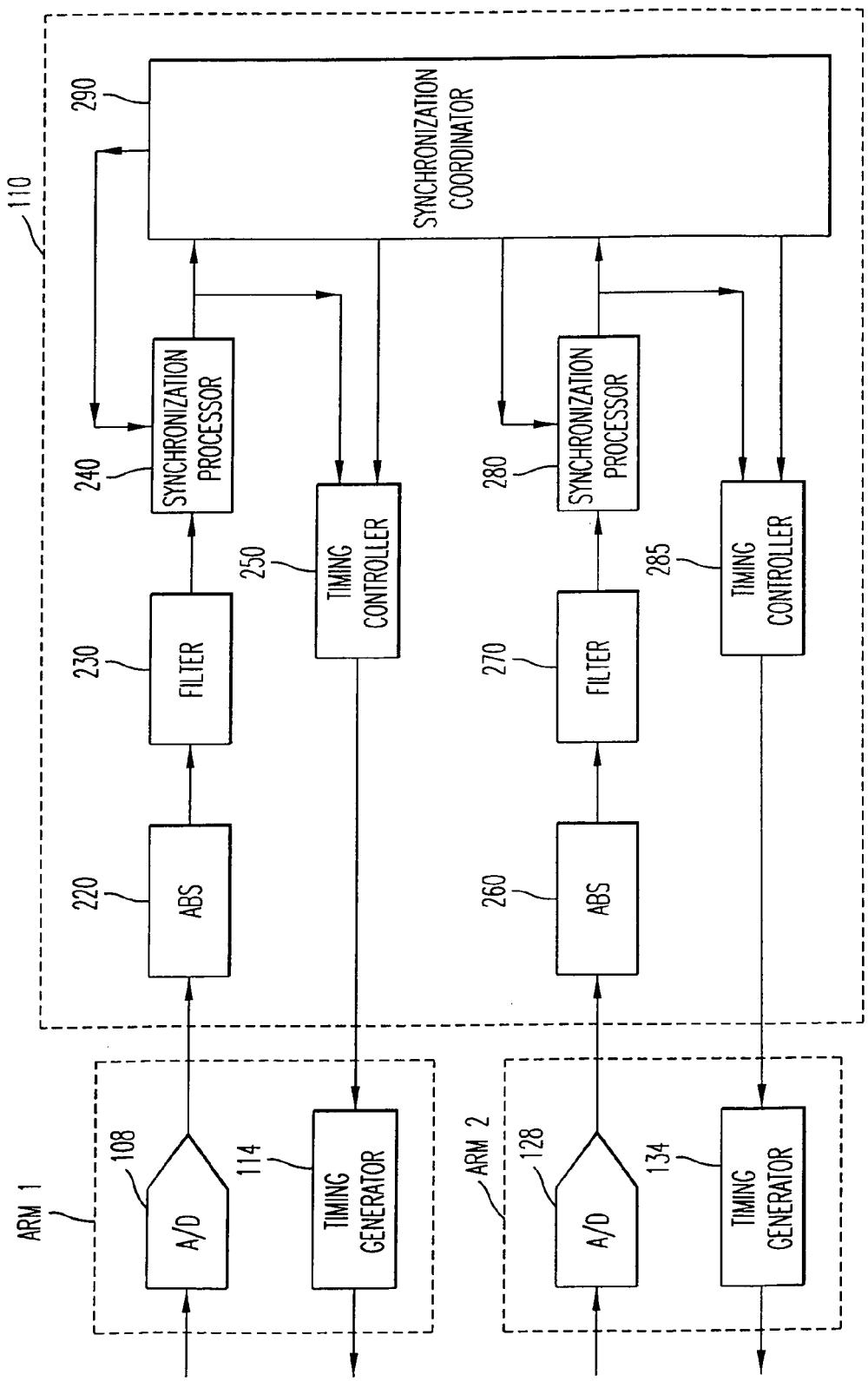
FIG. 4D illustrates the processing blocks employed within the digital controller of a receiver to acquire synchronization with the received pulses.

FIG. 4D shows the processing blocks employed within digital controller 110 of a receiver to acquire synchronization with the received pulses. In Arm 1, the incoming samples from the A/D converter 108 in FIG. 3 are passed to absolute value block 220 in digital controller 110. The absolute value block computes the absolute value of the input sample and passes the new value to filter block 230. Filter block 230 filters the incoming sequence of absolute values as a method of reducing noise. This filter could be any one a number of digital filters employed for these purposes, including but not limited to: all-pass filters, integrators, leaky integrators, box-car filters, other lowpass or bandpass finite impulse response filters, or lowpass or bandpass infinite impulse response filters. A complete description of these and other digital filters is given by Openheim and Shafer in *Digital Signal Processing*, the entire contents of which are incorporated herein by reference. The output of filter block 230 will be referred to as correlation value K. Correlation value K is passed into the synchronization processor block 240. The contents of synchronization processor block 240 are discussed below. Based upon information from synchronization processor block 240, timing controller block 250 sends commands out of the digital controller 110 to the timing generator 114. Similar functions are performed in Arm 2 for the associated blocks in FIG. 4D.

The synchronization coordinator 290 takes the synchronization information from the multiple correlation arms and combines and coordinates the data to ensure that the multiple correlation arms work together to ensure quality of service. The synchronization coordinator 290 sends control signals back to the synchronization processors 240, 280 and timing controllers 250, 285 as a means of directing the operation of the various arms.

Figure 5:
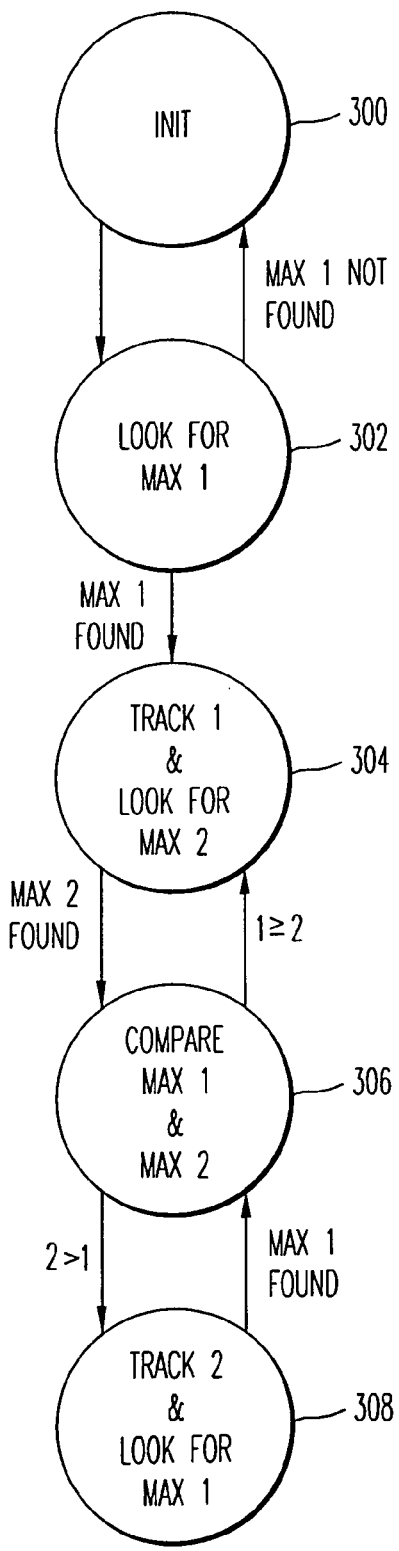
FIG. 5 is a state diagram of one embodiment for fast synchronization according to one embodiment of the present invention that uses multiple arms to detect a correlation value above a threshold of the correlation function of FIG. 4C.

FIG. 5 shows a state diagram of the fast synchronization state machine according to the present invention that finds a correlation value (or some parameter related to SNR) that exceeds a threshold $T_R$ of FIG. 4C. The state machine is initialized in state 300. Then Arm 1 looks for a correlation value that exceeds threshold $T_R$ in state 302. If the correlation value is not found, then the state machine transitions back to the initial state 300. However, if the correlation value is found, then the state machine transitions to state 304, where Arm 1 begins tracking the incoming signal and Arm 2 begins looking for a correlation value that exceeds threshold $T_R$. When the correlation value for Arm 2 is found, it is compared with the correlation value for Arm 1 in state 306. If the correlation value found by Arm 1 is greater than or equal to the correlation value found by Arm 2, then the incoming signal is tracked by Arm 1 in state 304. While the signal is being tracked in state 304, Arm 2 again looks for a correlation value that exceeds the threshold $T_R$. In state 306, if the correlation value found by Arm 1 is less than the correlation value found by Arm 2, then the incoming signal is tracked by Arm 2 in state 308 and Arm 1 begins looking for a new correlation value that exceeds the threshold. When the correlation value for Arm 1 is found, again a comparison is made in step 306. And the process repeats.

The code wheel is a representation of the user code with which the incoming data is coded. The code wheel can be visualized as a circular device containing the chips that make up the user code, where each chip is distributed at a fixed interval relative to its nearest neighbor around the code wheel from 0 to $2\pi$. Then, the interval between each chip is $2\pi/n$, where n is the number of chips in the code. One "rotation" of the code wheel, $2\pi$, is equivalent to the bit period $T_b$. So, through a "rotation," the phase of the local pulses from PFN 112 is adjusted such that the entire correlation function is generated. As such, when the incoming pulses are aligned with the locally generated pulses, a code wheel turn through one chip in the code ($2\pi/n$) is identical to a phase shift between adjacent pulses of the incoming signal.

Since there are multiple arms of the present invention, two arms for example, the code wheel is be swept by multiple arms concurrently. Arm 1 sweeps beginning at 0 phase of the code wheel. And Arm 2 begins sweeping at $\pi$ phase of the code wheel. Alternatively, Arm 1 could begin sweeping at $\pi$ phase of the code wheel and Arm 2 beginning at 0 phase of the code wheel. Yet another embodiment of the present invention could involve setting Arm 1 to sweep beginning at some arbitrary phase, $\phi_a$, and Arm 2 beginning at $\phi_a+\pi$. Starting at an arbitrary phase, $\phi_a$, instead of 0 is also applicable to the other embodiments described in this document. By dividing the code wheel between the two arms, synchronization is faster because both arms are working to synchronize the incoming signal. For k arms, the code wheel is divided into k regions such that the region of the code wheel swept by each arm comprises $2\pi/k$ phases before the entire code wheel searched.

After phase acquisition, the received signal may be tracked as a means of maintaining synchronization as in steps 304 and 308 of FIG. 5. This can be done by methods described in, for example, co-pending U.S. patent application entitled "ULTRAWIDE BANDWIDTH SYSTEM AND METHOD FOR FAST SYNCHRONIZATION," Ser. No. 09/685,195 now U.S. Pat. No. 6,925,108, filed concurrently with the present document and having common inventorship as with the present document, the contents of which being incorporated herein by reference. As discussed in the above referenced co-pending patent, many embodiments for performing phase tracking are possible in the current invention. These tracking methods may employ more than one mixer, or just the on-time term from a single mixer as illustrated in the embodiments of the above referenced co-pending patent. During the process of tracking incremental phase errors, a method may be employed for making frequency adjustments to the timing generator 7 in FIG. 1A. Various embodiments involving frequency acquisition are possible as discussed in the above co-pending patent.

Figure 6:
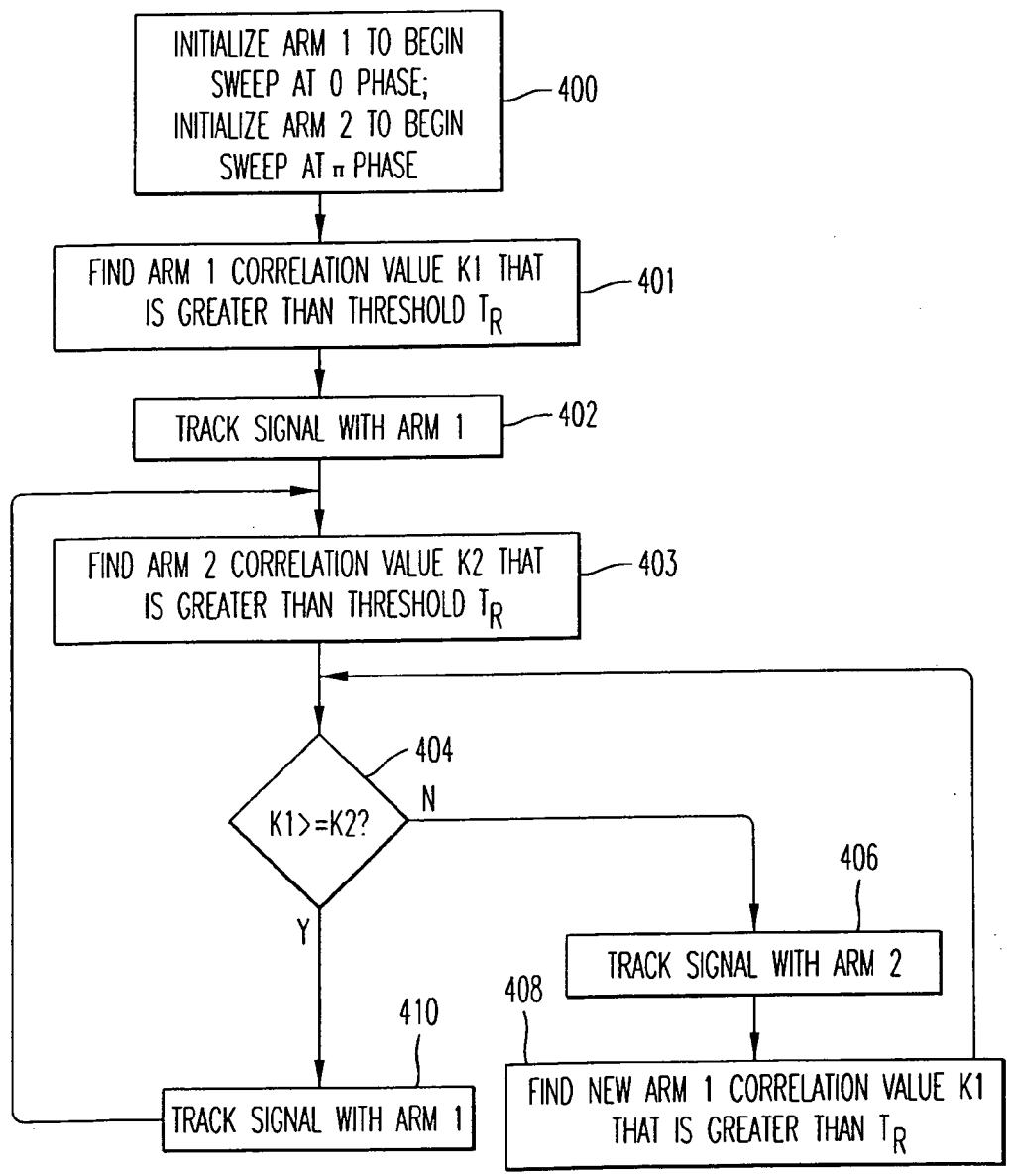
FIG. 6 is a flowchart outlining general steps performed by the embodiment of FIG. 5.

FIG. 6 is a flowchart outlining the general steps performed by the exemplary embodiment of FIG. 5. In step 400, Arm 1 is initialized to begin sweeping at 0 phase of the code wheel and Arm 2 is initialized to begin sweeping at $\pi$ phase of the code wheel. Alternatively, Arm 1 could be initialized to begin sweeping at $\pi$ phase of the code wheel and Arm 2 at 0 phase of the code wheel. In step 401, Arm 1 sweeps the code wheel to determine a correlation value K1 (or some parameter related to SNR) of the incoming signal with the generated local pulse at PFN 112 that exceeds predetermined threshold $T_R$. When K1 is found, the incoming signal is then tracked with Arm 1 in step 402. In step 403, while Arm 1 is tracking the incoming signal, Arm 2 sweeps the code wheel to determine a correlation value K2 that exceeds the threshold $T_R$. So in step 404, a comparison is made between K1 and K2. If K1 is greater than or equal to K2, then SNR of the signal tracked by Arm 1 is better than or the same as that of Arm 2. So, tracking continues on Arm 1 in step 410. And the process repeats beginning with step 403, where Arm 2 again sweeps the code wheel to find a new K2. However, if K2 is greater than K1, then Arm 2 found a better SNR of the incoming signal. So, Arm 2 tracks the signal in step 406. And, in step 408, Arm 1 sweeps the code wheel to find a new correlation value K1 that is greater than the threshold $T_R$. Then new K1 is compared to K2 and the process repeats beginning with step 404. Alternatively, multiple arms (more than two) may be used in this embodiment.

Figure 7:
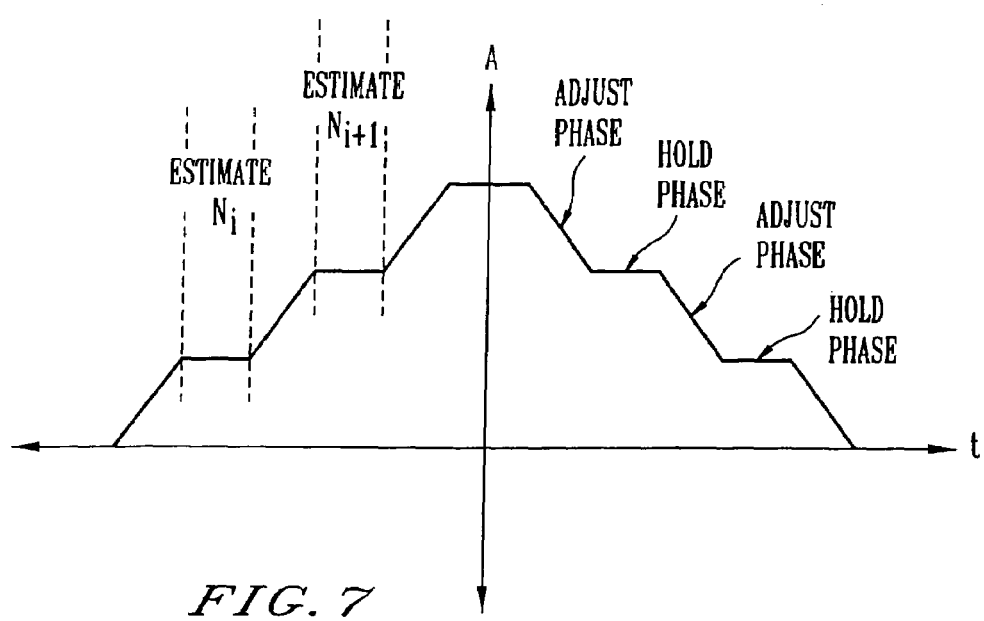
FIG. 7 is an exemplary correlation function derived by repeatedly sweeping the phase for a period of time and then holding the phase constant for a period of time.

During a code wheel turn, the phase of the local pulse train is scanned from 0 to $2\pi$. The method of scanning the phase can have various embodiments. In FIG. 7, the magnitude of an exemplary correlation result is presented as a function of time (and phase, since phase is scanned), where the phase of the locally generated pulse train is repeatedly changed relative to the input pulse sequence for a period of time and then held constant for a period of time. The plateaus indicate time periods when the phase is held constant. Of course this is a hypothetical example in which there is no noticeable frequency drift between the transmitter and receiver. The sloped portions of the curve indicate time periods over which the phase is changing. During periods of constant phase, statistics such as mean absolute correlation value and noise variance can be calculated as a method of determining if the local pulse train is locked to the incoming signal at the present phase. As illustrated, the maximum of the curve occurs on the highest plateau, although this is not necessarily the case in all scans. Furthermore, the curve appears to increase linearly between plateaus. This, too, is for illustrative purposes only. The scan and hold process can be repeated over the entire rotation of the code wheel from 0 to $2\pi$ radians (not shown), or it can be performed over a limited phase range for sub-code wheel spins. Although FIG.

7 illustrates a piecewise continuous scan through the correlation function, the correlation function is computed only at discreet phases.

Figure 8:
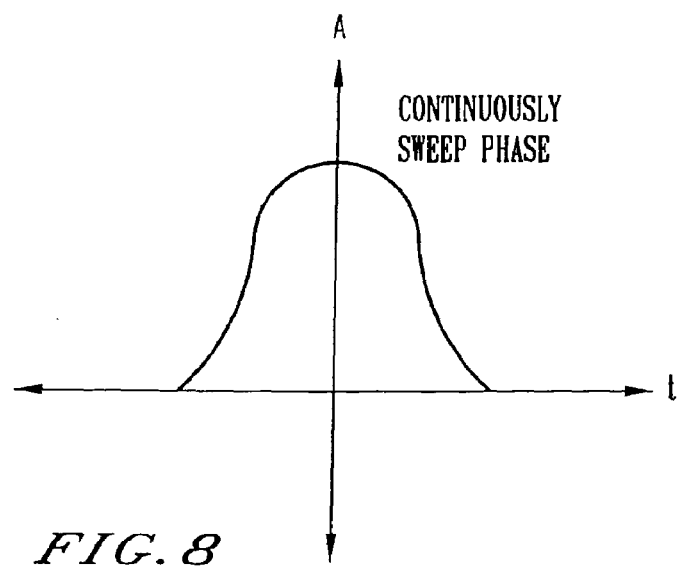
FIG. 8 is another exemplary correlation function in which the phase is continuously swept.

In FIG. 8, the magnitude of an exemplary correlation result is presented as a function of time (and phase, since phase is scanned), where the phase of the locally generated pulse train is repeatedly changed relative to the input pulse sequence over a complete phase range (from zero to $2\pi$ radians) or a limited (<$2\pi$ radians) phase range for sub-code wheel spins. The correlation result displayed in FIG. 8 is an abbreviated version of the complete phase range correlation illustrated in FIG. 4C. For example, the negative portions of the correlation in FIG. 4C are omitted since they lie outside the scan range. Although FIG. 8 illustrates a continuous scan through the correlation function, the correlation function is computed only at discreet phases.

Figure 9:
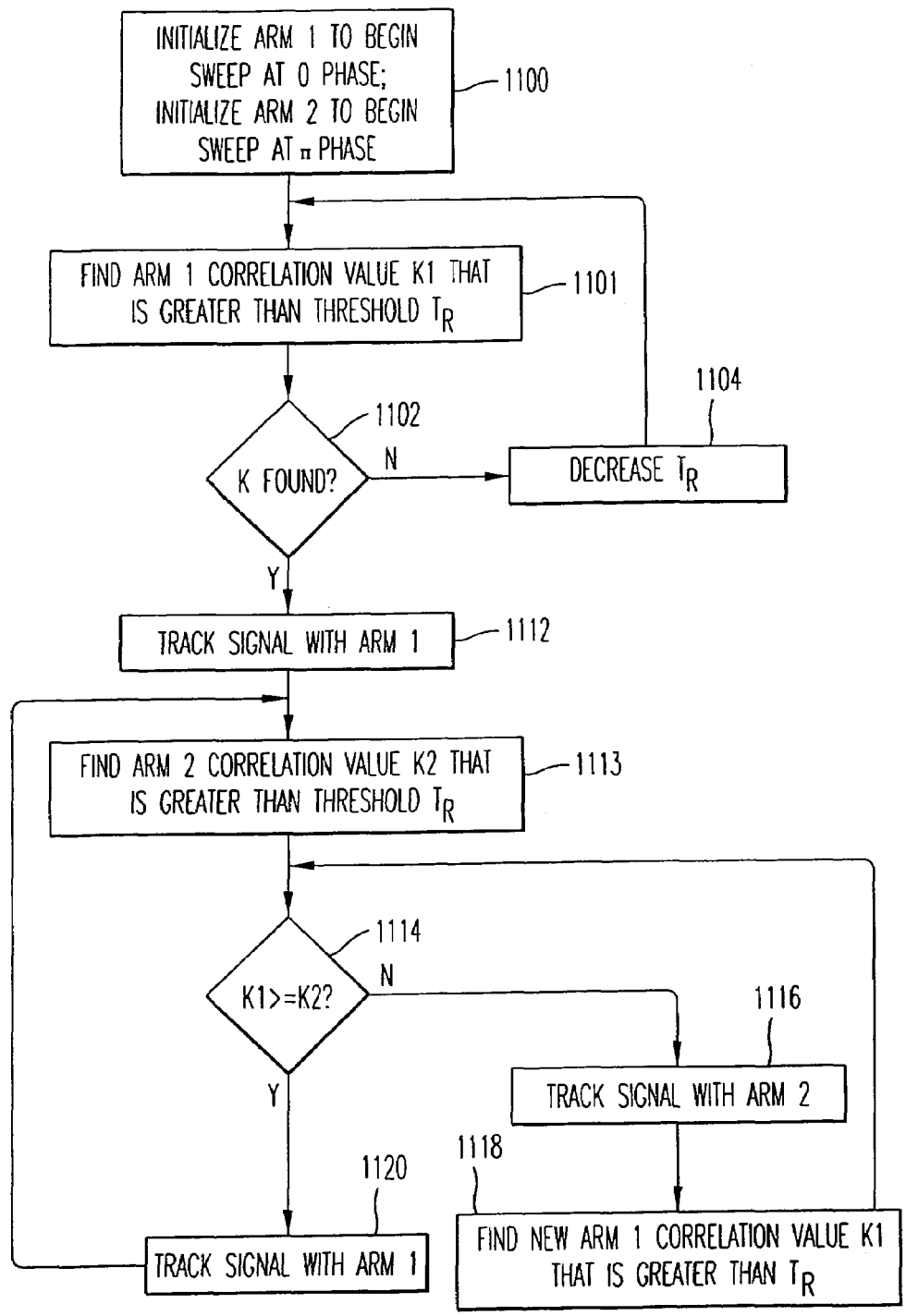
FIG. 9 is a flowchart outlining the general steps of another embodiment of the present invention.

FIG. 9 is a flow chart outlining the general steps performed by an embodiment of the present invention. In step 1100, Arm 1 is initialized to begin sweeping at 0 phase of the code wheel and Arm 2 is initialized to begin sweeping at $\pi$ phase of the code wheel. Alternatively, Arm 1 could be initialized to begin sweeping at $\pi$ phase of the code wheel and Arm 2 at 0 phase of the code wheel or any initial phases of the two arms. In step 1101, Arm 1 sweeps the code wheel to determine a correlation value K1 (or some parameter related to SNR) of the incoming signal with the generated local pulses at PFN 112 that exceeds predetermined threshold $T_R$. In step 1102, an inquiry is made whether K1 was found. If not, threshold $T_R$ is decreased in step 1104. Then the process repeats beginning with step 1101. However, if K1 was found, then Arm 1 tracks the incoming signal in step 1112. In step 1113, while Arm 1 is tracking the incoming signal, Arm 2 sweeps the code wheel to determine a correlation value K2 that exceeds the threshold $T_R$. So, in step 1114, a comparison is made between K1 and K2. If K1 is greater than or equal to K2, then SNR of the signal tracked by Arm 1 is better than or the same as that of Arm 2. So, tracking continues on Arm 1 in step 1120. And the process repeats beginning with step 1113, where Arm 2 again sweeps the code wheel to find a new K2. However, if K2 is greater than K1, then Arm 2 found a better SNR of the incoming signal. So, Arm 2 tracks the signal in step 406. And, in step 408, Arm 1 sweeps the code wheel to find a new correlation value K1 that is greater than the threshold $T_R$. Then new K1 is compared to K2 and the process repeats beginning with step 1114. Alternatively, multiple arms (more than two) may be used in this embodiment.

Figure 10:
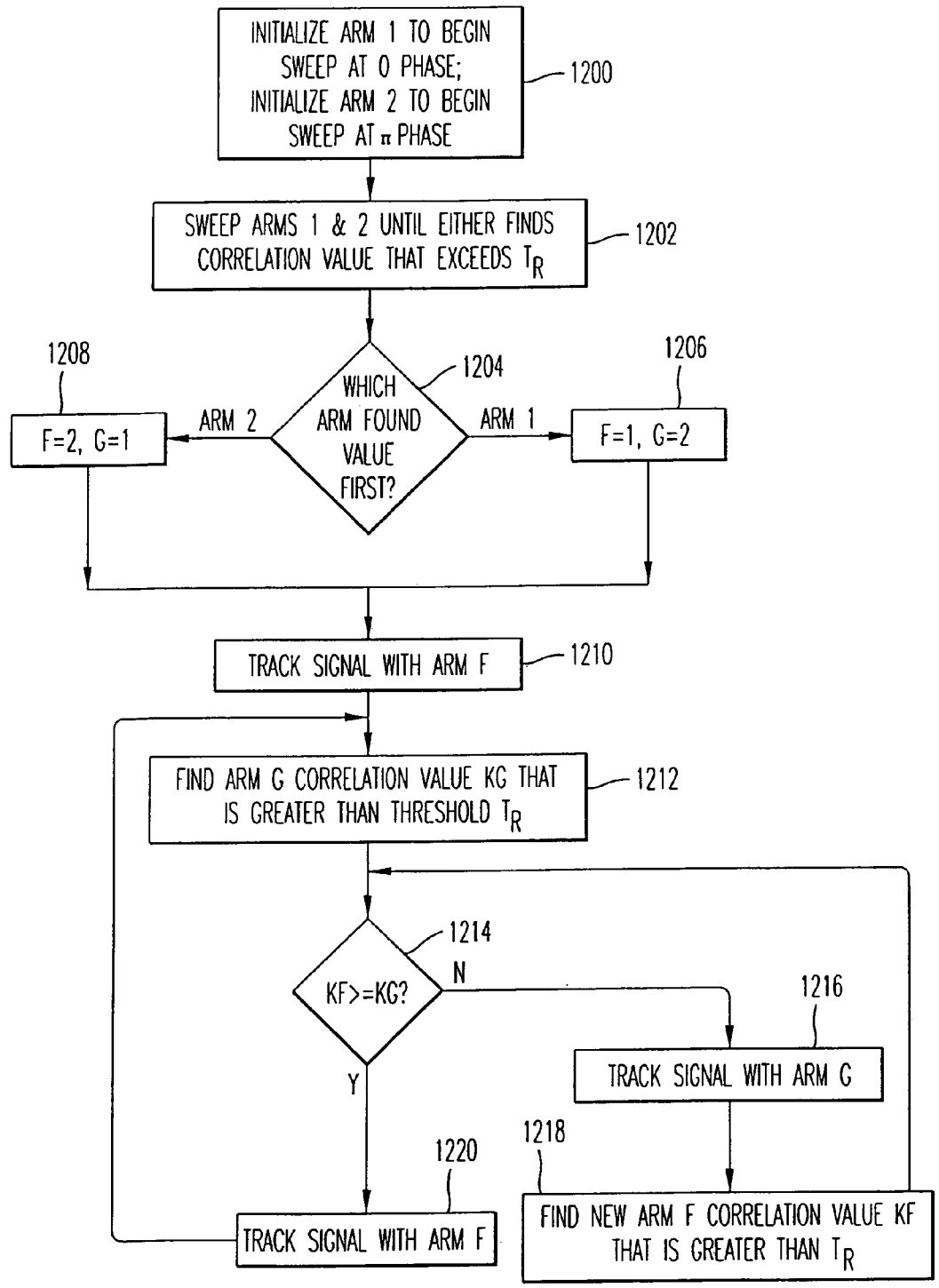
FIG. 10 is a flowchart outlining the general steps of still another embodiment of the present invention.

FIG. 10 is a flow chart outlining the general steps performed by another embodiment of the present invention. In step 1200, Arm 1 is initialized to begin sweeping at 0 phase of the code wheel and Arm 2 is initialized to begin sweeping at $\pi$ phase of the code wheel. Alternatively, Arm 1 could be initialized to begin sweeping at $\pi$ phase of the code wheel and Arm 2 at 0 phase of the code wheel or any partitioning of the code wheel in two. In step 1202, Arms 1 and 2 sweep the code wheel until either of them finds a correlation value (or some parameter related to SNR) that exceeds the threshold $T_R$. In step 1204, an inquiry is made about which arm found its correlation value first. If Arm 1 found a correlation value that exceeds the threshold first, then Arm 1 begins tracking first after setting parameters F and G in step 1206. The parameter F represents the arm that finds a correlation value that exceeded the threshold first and parameter G represents the other arm. So if Arm 1 found a correlation value K1 first, F=1 and G=2. Then Arm 1 tracks the incoming signal in step 1210. In step 1212, while Arm 1 is tracking the incoming signal, Arm 2 sweeps the code wheel to determine a correlation value K2 that exceeds the threshold. If K1 is greater than or equal to K2, in step 1214, then tracking continues on Arm 1 in step 1220. And the process repeats beginning with step 1212. However if K2 is greater than K1, then Arm 2 tracks the signal in step 1216. And, in step 1218, Arm 1 sweeps the code wheel to find a new correlation value K1 that is greater than the threshold. Then new K1 is compared to K2 and the process repeats beginning with step 1214. In step 1204, if Arm 2 found a correlation value K2 that exceeds the threshold first, F=2 and G=1 in step 1208. Then Arm 2 tracks the signal in step 1210. In step 1212, while Arm 2 is tracking the incoming signal, Arm 1 sweeps the code wheel to determine a correlation value K1 that exceeds the threshold. So, in step 1214, a comparison is made between K2 and K1. If K2 is greater than or equal to K1, then tracking continues on Arm 2 in step 1220. And the process repeats beginning with step 1212, where Arm 1 again sweeps the code wheel to find a new K1. However, if K1 is greater than K2, then Arm 1 tracks the signal in step 1216. And, in step 1218, Arm 2 sweeps the code wheel to find a new correlation value K2 that is greater than the threshold. Then new K2 is compared to K1 and the process repeats beginning with step 1214. Alternatively, multiple arms (more than two) may be used in this embodiment.

Figure 11:
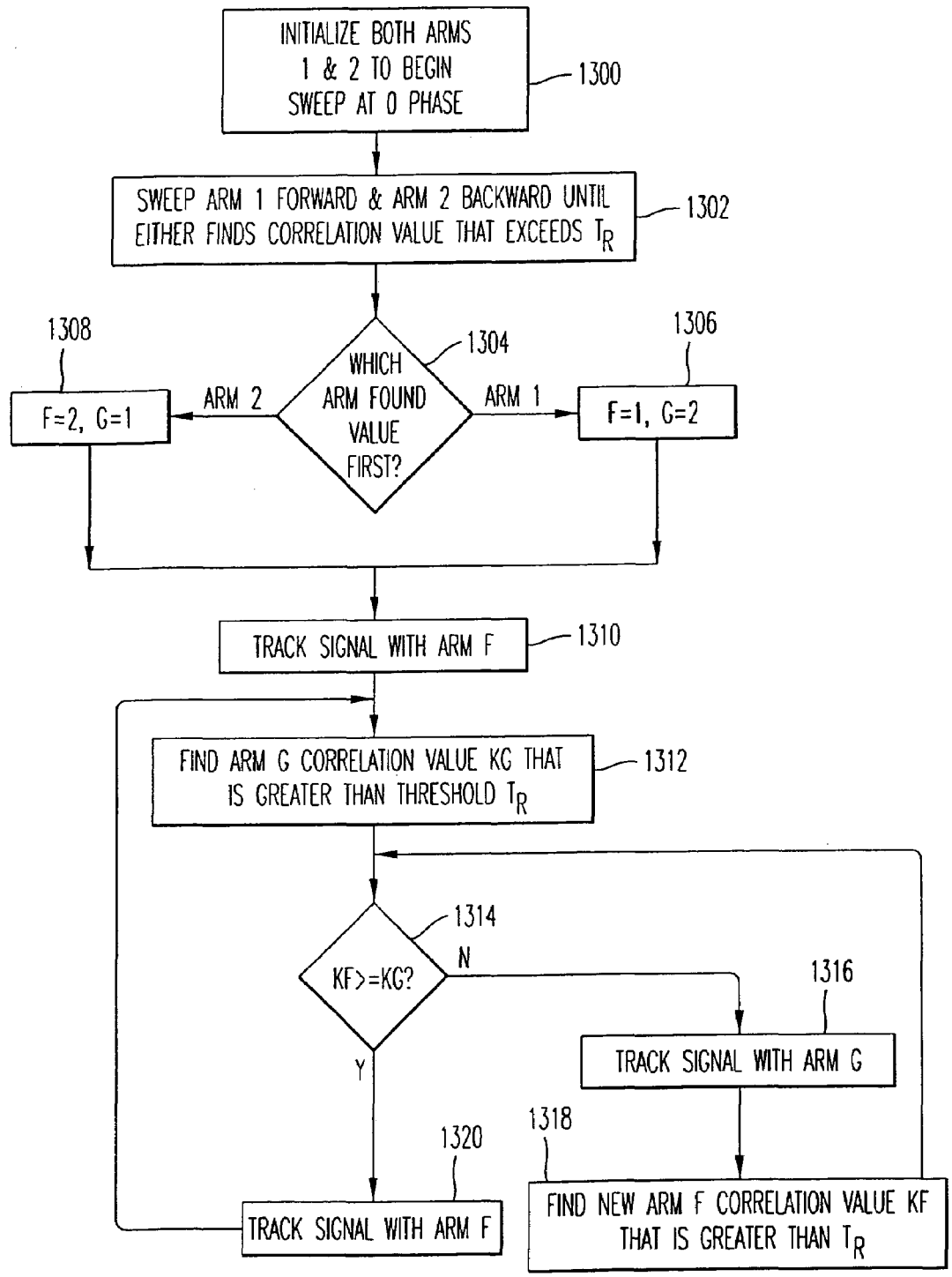
FIG. 11 is a flowchart outlining the general steps of yet another embodiment of the present invention.

FIG. 11 is a flow chart outlining the general steps performed by another embodiment of the present invention. Here, Arms 1 and 2 are initialized to begin sweeping at 0 phase of the code wheel in step 1300. In step 1302, Arm 1 begins sweeping forward and Arm 2 backward until either finds a correlation value (or some parameter related to SNR) that exceeds a threshold $T_R$. Steps 1304–1320 are the same as steps 1204–1220 of FIG. 10. Alternatively, multiple arms (more than two) may be used in this embodiment.

The UWB transceiver of FIGS. 1a, 1b, and 2 may be used to perform a radio transport function for interfacing with different applications as part of a stacked protocol architecture. In such a configuration, the UWB transceiver performs signal creation, transmission and reception functions as a communications service to applications that send data to the transceiver and receive data from the transceiver much like a wired I/O port. Moreover, the UWB transceiver may be used to provide a wireless communications function to any one of a variety of devices that may include interconnection to other devices either by way of wired technology or wireless technology. Thus, the UWB transceiver of FIG. 1a may be used as part of a local area network (LAN) connecting fixed structures or as part of a wireless personal area network (WPAN) connecting mobile devices, for example. In any such implementation, all or a portion of the present invention may be conveniently implemented in a microprocessor system using conventional general purpose microprocessors programmed according to the teachings of the present invention, as will be apparent to those skilled in the microprocessor systems art. Appropriate software can be readily prepared by programmers of ordinary skill based on the teachings of the present disclosure, as will be apparent to those skilled in the software art.

Figure 12:
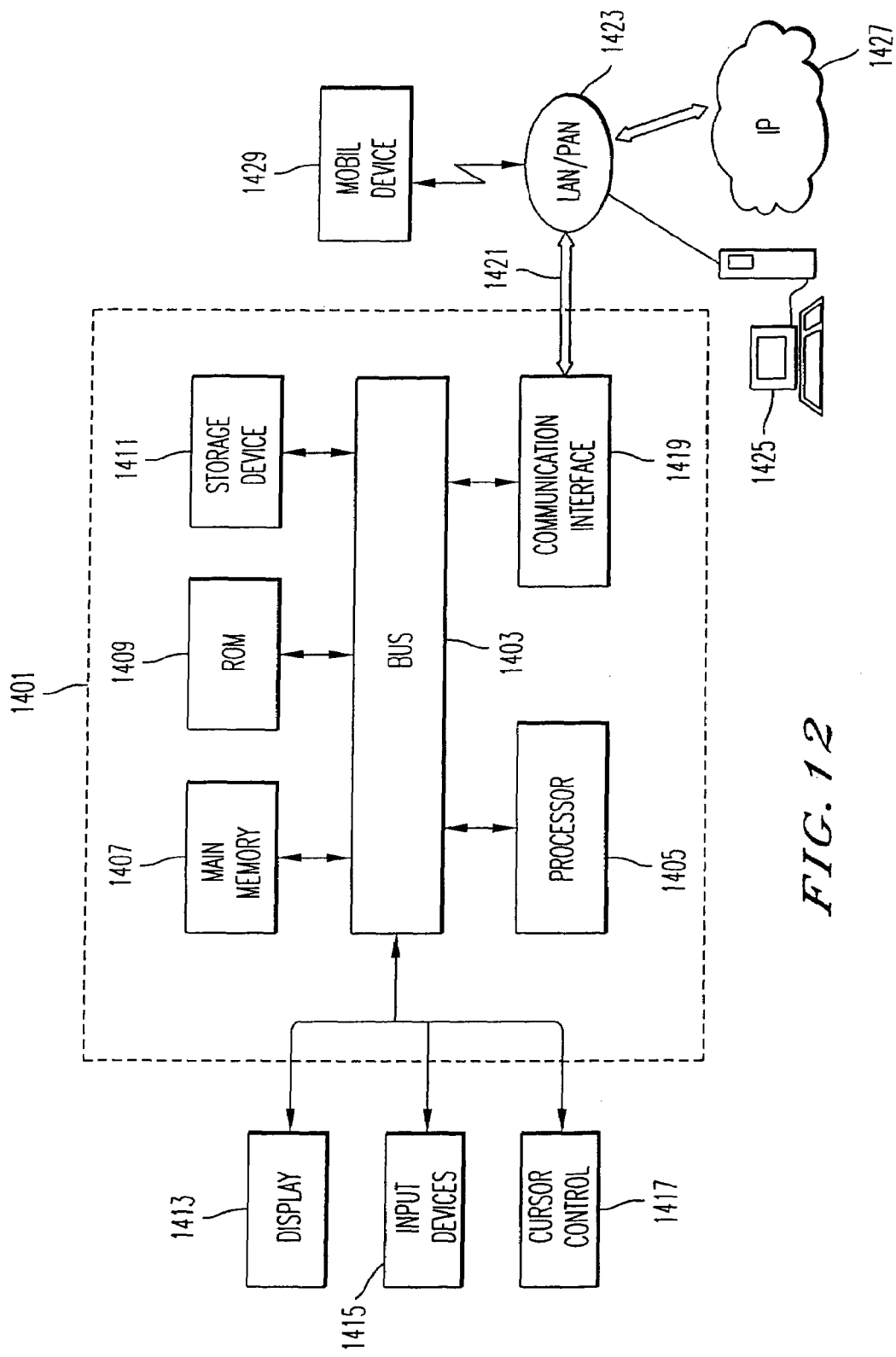
FIG. 12 shows a processor system in which an embodiment of the present invention may be implemented.

FIG. 12 illustrates a processor system 1401 upon which an embodiment according to the present invention may be implemented. The system 1401 includes a bus 1403 or other communication mechanism for communicating information, and a processor 1405 coupled with the bus 1403 for processing the information. The processor system 1401 also includes a main memory 1407, such as a random access memory (RAM) or other dynamic storage device (e.g., dynamic RAM (DRAM), static RAM (SRAM), synchronous DRAM (SDRAM), flash RAM), coupled to the bus 1403 for storing information and instructions to be executed by the processor 1405. In addition, a main memory 1407 may be used for storing temporary variables or other intermediate information during execution of instructions to be executed by the processor 1405. The system 1401 further includes a read only memory (ROM) 1409 or other static storage device (e.g., programmable ROM (PROM), erasable PROM (EPROM), and electrically erasable PROM (EEPROM)) coupled to the bus 1403 for storing static information and instructions for the processor 1405. A storage device 1411, such as a magnetic disk or optical disc, is provided and coupled to the bus 1403 for storing information and instructions.

The processor system 1401 may also include special purpose logic devices (e.g., application specific integrated circuits (ASICs)) or configurable logic devices (e.g., simple programmable logic devices (SPLDs), complex programmable logic devices (CPLDs), or re-programmable field programmable gate arrays (FPGAs)). Other removable media devices (e.g., a compact disc, a tape, and a removable magneto-optical media) or fixed, high density media drives, may be added to the system 301 using an appropriate device bus (e.g., a small system interface (SCSI) bus, an enhanced integrated device electronics (IDE) bus, or an ultra-direct memory access (DMA) bus). The system 1401 may additionally include a compact disc reader, a compact disc reader-writer unit, or a compact disc jukebox, each of which may be connected to the same device bus or another device bus.

The processor system 1401 may be coupled via the bus 1403 to a display 1413, such as a cathode ray tube (CRT) or liquid crystal display (LCD) or the like, for displaying information to a system user. The display 1413 may be controlled by a display or graphics card. The processor system 1401 includes input devices, such as a keyboard or keypad 1415 and a cursor control 1417, for communicating information and command selections to the processor 1405. The cursor control 1417, for example, is a mouse, a trackball, or cursor direction keys for communicating direction information and command selections to the processor 1405 and for controlling cursor movement on the display 1413. In addition, a printer may provide printed listings of the data structures or any other data stored and/or generated by the processor system 1401.

The processor system 1401 performs a portion or all of the processing steps of the invention in response to the processor 1405 executing one or more sequences of one or more instructions contained in a memory, such as the main memory 1407. Such instructions may be read into the main memory 1407 from another computer-readable medium, such as a storage device 1411. One or more processors in a multi-processing arrangement may also be employed to execute the sequences of instructions contained in the main memory 1407. In alternative embodiments, hard-wired circuitry may be used in place of or in combination with software instructions. Thus, embodiments are not limited to any specific combination of hardware circuitry and software.

As stated above, the processor system 1401 includes at least one computer readable medium or memory programmed according to the teachings of the invention and for containing data structures, tables, records, or other data described herein. Stored on any one or on a combination of computer readable media, the present invention includes software for controlling the system 1401, for driving a device or devices for implementing the invention, and for enabling the system 1401 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpretable programs, dynamic link libraries, Java or other object oriented classes, and complete executable programs. Moreover, parts of the processing of the present invention may be distributed for better performance, reliability, and/or cost.

The term "computer readable medium" as used herein refers to any medium that participates in providing instructions to the processor 1405 for execution. A computer readable medium may take many forms, including but not limited to, non-volatile media, volatile media, and transmission media. Non-volatile media includes, for example, optical, magnetic disks, and magneto-optical disks, such as the storage device 1411. Volatile media includes dynamic memory, such as the main memory 1407. Transmission media includes coaxial cables, copper wire and fiber optics, including the wires that comprise the bus 1403. Transmission media may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave, carrierless transmissions, or any other medium from which a system can read.

Various forms of computer readable media may be involved in providing one or more sequences of one or more instructions to the processor 1405 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to system 1401 may receive the data on the telephone line and use an infrared transmitter to convert the data to an infrared signal. An infrared detector coupled to the bus 1403 can receive the data carried in the infrared signal and place the data on the bus 1403. The bus 1403 carries the data to the main memory 1407, from which the processor 1405 retrieves and executes the instructions. The instructions received by the main memory 1407 may optionally be stored on a storage device 1411 either before or after execution by the processor 1405.

The processor system 1401 also includes a communication interface 1419 coupled to the bus 1403. The communications interface 1419 provides a two-way UWB data communication coupling to a network link 1421 that is connected to a communications network 1423 such as a local network (LAN) or personal area network (PAN) 1423. For example, the communication interface 1419 may be a network interface card to attach to any packet switched UWB-enabled personal area network (PAN) 1423. As another example, the communication interface 1419 may be a UWB accessible asymmetrical digital subscriber line (ADSL) card, an integrated services digital network (ISDN) card, or a modem to provide a data communication connection to a corresponding type of communications line. The communications interface 1419 may also include the hardware to provide a two-way wireless communications coupling other than a UWB coupling, or a hardwired coupling to the network link 1421. Thus, the communications interface 1419 may incorporate the UWB transceiver of FIGS. 1*a*, 1*b*, and/or FIG. 2 as part of a universal interface that includes hardwired and non-UWB wireless communications coupling to the network link 1421.

The network link 1421 typically provides data communication through one or more networks to other data devices. For example, the network link 1421 may provide a connection through a LAN to a host computer 1425 or to data equipment operated by a service provider, which provides data communication services through an IP (Internet Protocol) network 1427. Moreover, the network link 1421 may provide a connection through a PAN 1423 to a mobile device 1429 such as a personal data assistant (PDA) laptop computer, or cellular telephone. The LAN/PAN communications network 1423 and IP network 1427 both use electrical, electromagnetic or optical signals that carry digital data streams. The signals through the various networks and the signals on the network link 1421 and through the communication interface 1419, which carry the digital data to and from the system 1401, are exemplary forms of carrier waves transporting the information. The processor system 1401 can transmit notifications and receive data, including program code, through the network(s), the network link 1421 and the communication interface 1419.

Figure 13A:
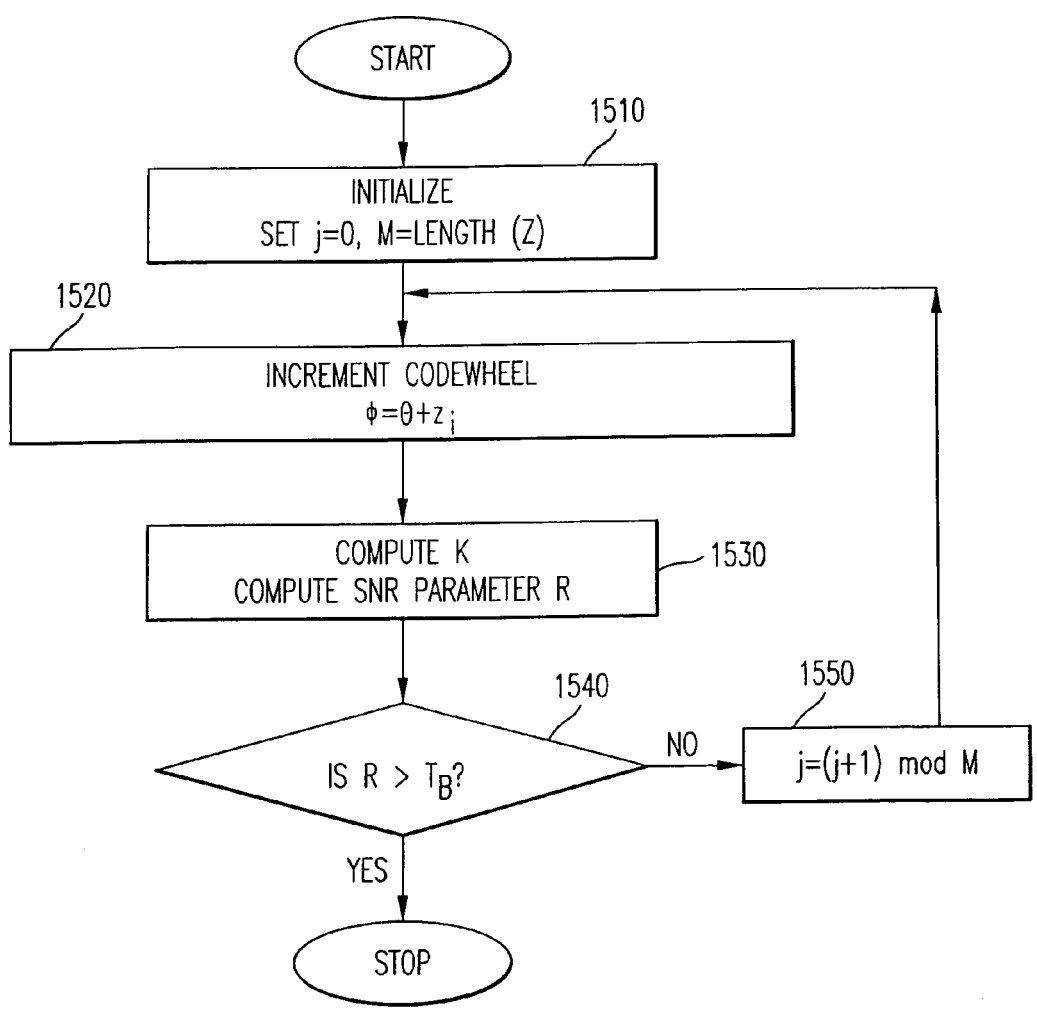
FIGS. 13A–B are flowcharts of different embodiments for performing a non-exhaustive code wheel search to find a sufficient (not necessarily optimal) synchronization phase using either linear or non-linear phase scans over the code wheel.

FIG. 13A is a flowchart of an embodiment for performing a non-exhaustive code wheel search to find a sufficient (not necessarily optimal) synchronization phase using either linear or non-linear phase scans over the code wheel. In step 1510, the process is initialized. A vector Z of phase offsets is defined. M is calculated as the length of the phase offset vector Z. Define $z_j$ as the elements of vector Z, such that $Z=[z_0, \ldots, z_{M-1}]$. Initialize the counter j to zero. Some example Z vectors are shown in FIG. 14 and described later.

In step 1520, the phase offset, φ, is incremented by $z_j$ from the initial phase offset θ, which may be random, such that φ=θ+$z_j$. In step 1530, the correlation estimate for the current phase offset, K, is computed. K is then used to compute the SNR parameter R. This can be done by methods described in, for example, co-pending U.S. patent application entitled "MODE CONTROLLER FOR SIGNAL ACQUISITION AND TRACKING IN AN ULTRA WDEBAND COMMUNICATIONS SYSTEM," Ser. No. 09/685,197 now U.S. Pat. No. 6,965,630, filed concurrently with the present document and having common inventorship as with the present document, the contents of which being incorporated herein by reference.

As discussed in the above referenced co-pending patent, parameters can be calculated that are related to signal power and noise power. Specifically, as described in an example embodiment in the above referenced co-pending patent, the A/D sample value for bit i, $x_i$, can be statistically represented as Equation 1 for A/σ greater than 2.3 where A is the received signal amplitude and σ is the noise standard deviation.

$$|x_i|=A+\sigma n_I \qquad (1)$$

Through mathematical manipulations, a combination of these parameters can be compared to a threshold to establish a maximal BER operating point. More specifically, a minimal SNR point can be defined for radio operation. Through use of these easy to calculate and low-cost parameters, an instantaneous estimate of the current SNR of the receiver is available for the purposes of making control decisions such as whether or not a correlator arm is locked onto a received signal. Specifically, as described in an example embodiment in the above referenced co-pending patent, a lock parameter L can be calculated as:

$$L=\text{sign}(m_1-Ks_1) \qquad (2)$$

where $$m_1 = \left(\sum_{i=1}^{B} |x_i|\right)^2 \qquad (3)$$

$$s_1 = \sum_{i=1}^{B} x_i^2 \qquad (4)$$

and K is chosen such that $$\frac{A^2}{\sigma^2} > \frac{K-1}{B-K}. \qquad (5)$$

Parameters other than $m_1$ and $s_1$ as defined above can employed in a similar manner as detailed in the above referenced co-pending patent.

In step 1540, if R is greater than a threshold indicative of a minimal acceptable SNR, $T_b$, then the flow process ends. Otherwise, in step 1550, j is incremented to cycle through the vector Z according to the equation j=(j+1)mod(M). The process then returns to step 1520.

Figure 13B:
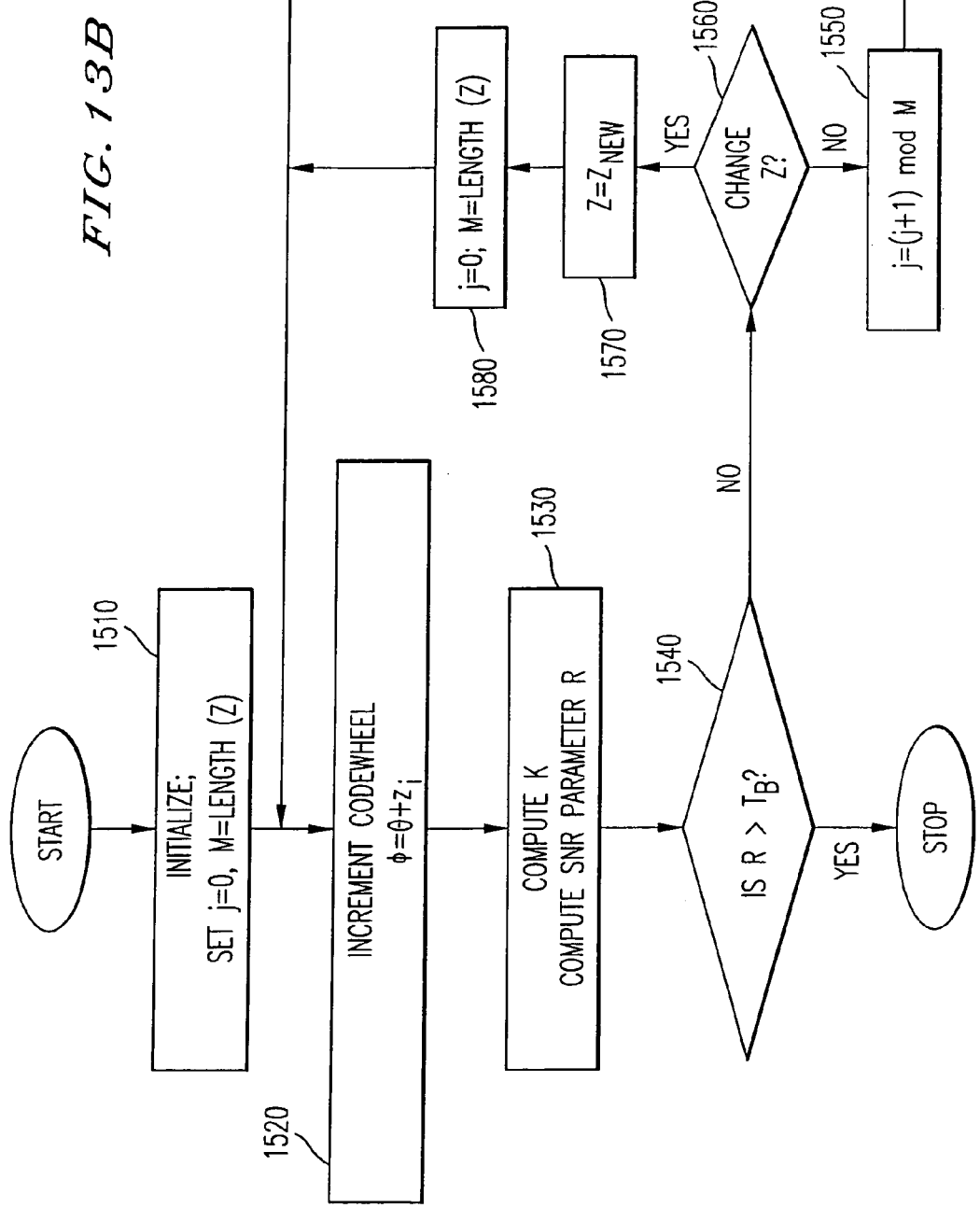

FIG. 13B is also a flowchart of an embodiment for performing a non-exhaustive code wheel search to find a sufficient (not necessarily optimal) synchronization phase using either linear or non-linear phase scans over the code wheel. In step 1510, the process is initialized as in FIG. 13A. In step 1520, the phase offset, φ, is incremented by $z_j$ from the initial phase offset θ, which may be random, such that φ=θ+$z_j$. In step 1530, the correlation estimate for the current phase offset, K, is computed. K is then used to compute the SNR parameter R as described in FIG. 13A. In step 1540, if R is greater than a threshold indicative of a minimal acceptable SNR, $T_b$, then the flow process ends. Otherwise, in step 1560, a decision is made whether to change the vector Z. If Z is not going to be changed, the flow proceeds to step 1550 where j is incremented to cycle through the vector Z according to the equation j=(j+1)mod(M) and then process then returns to step 1520. Otherwise, the flow proceeds from step 1560 to step 1570 where Z is set to a new Z. In step 1580, j is reset to zero, and M is calculated to be the length of the new Z.

FIGS. 14A–D describe and illustrate example vectors that contain elements corresponding to shifts in phase angle from an initial phase angle. FIG. 14A illustrates an example vector Z1 that corresponds to a continuous scan from an initial or zero phase to a maximum phase. The duration of the phase can be less than 2π radians. As illustrated in FIG. 14A, this maximum number of code wheel increments is less than 2π radians, although this need not be the case. Since the phase increases monotonically by a fixed increment throughout Z1, Z1 is referred to as linear phase scan. The written vector representation of Z1 includes the term "n" which denotes an arbitrary local parameter that controls how fast the code wheel spins depending on the time increment step size, and can be adjusted to accommodate, for example, the finite time that it takes a phase shift to a new, discrete phase, to occur. As n is decreased, the time resolution of the phase scan increases. "Q" is the total number of code wheel increments in each of the defined vectors of FIGS. 14A–D.

The first example of vector Z2, illustrated both as a plot and in written notation in FIG. 14B, describes a bidirectional scan that steps between portions of the phase to be scanned. In other words, the phase scan described by the first example of vector Z2 commences with the zero phase position and proceeds in discrete steps through an arbitrary number of m steps to a phase corresponding to m−1 increments. "m" is a number of phase increments that is strictly less than the total number of increments in the vector Z2. At this point, the code wheel rotates to a position one phase increment prior to the initial (or zero) phase, at which time the code wheel proceeds to scan negatively through 2m steps to a phase corresponding to −2m increments. Once this portion of the scan is completed, the code wheel returns to a phase corresponding to a positive m increments, and proceeds as indicated in both the written and plot description of the vector. The scan order axis of the plot indicates the succession of these phase scans in time, with the first scan being represented at the highest position along this axis. Furthermore, the phase shift corresponding to Q−1 (the full phase range) has been left off of the phase axis of FIGS. 14B (and 15C and 15D) in order to illustrate that the phase shift corresponding to Q−1 could be found on either side of the zero or initial phase position, and could stop the phase scan at any phase angle, even those within the illustrated or written vector. By scanning phase shifts that are closest to the zero or initial phase first, the phase shifts with the highest probability of synchronizing the locally-generated pulse train with the received pulse train are examined first, especially in cases when a communications link has already been established, and an attempt is being made to reestablish the link.

The second example of vector Z2, illustrated both as a plot and in written notation in FIG. 14C, describes a bidirectional scan that steps between portions of the phase to be scanned, where the portions to be scanned are the same size. This approach is slightly less efficient than the approach illustrated in FIG. 14B since the number of steps is increased while the relative proximity of the scanned phase angles to the zero or initial phase angle is the same.

The third example vector Z2, illustrated both as a plot and in written notation in FIG. 14D, describes a unidirectional scan that steps between portions of the phase to be scanned, where the portions to be scanned are scanned in order of proximity to the zero or initial phase angle. In other words, the phase is first incremented from a negative phase angle corresponding to −m increments of the code wheel through the zero or initial phase angle to a positive phase angle corresponding to +2m increments of the code wheel. At this time, the code wheel is returned to a negative phase angle corresponding to −3m increments of the code wheel, and proceeds to increment the code wheel in a positive direction from a negative phase angle corresponding to −m−1 increments of the code wheel, at which time it proceeds as illustrated. Thus, in this example vector Z2, unidirectional scanning of the phase can be used to scan the regions closest to the initial or zero position of the phase angle.

FIG. 14A presents an example of a linear phase scan whereas FIGS. 14B–D present examples of non-linear phase scans. These examples are only illustrative. Other embodiments of scanning phase over a code wheel are also applicable to the present invention.

In FIG. 13, the scan vector Z may be either Z1 or Z2 as illustrated in FIGS. 14A–D, or any combination of these or other phase scans. For example, Z could be appended copies of different embodiments of Z2 and Z1. Preferably, the resulting phase scan vector Z covers the entire code wheel, perhaps not uniquely.

Figure 15:
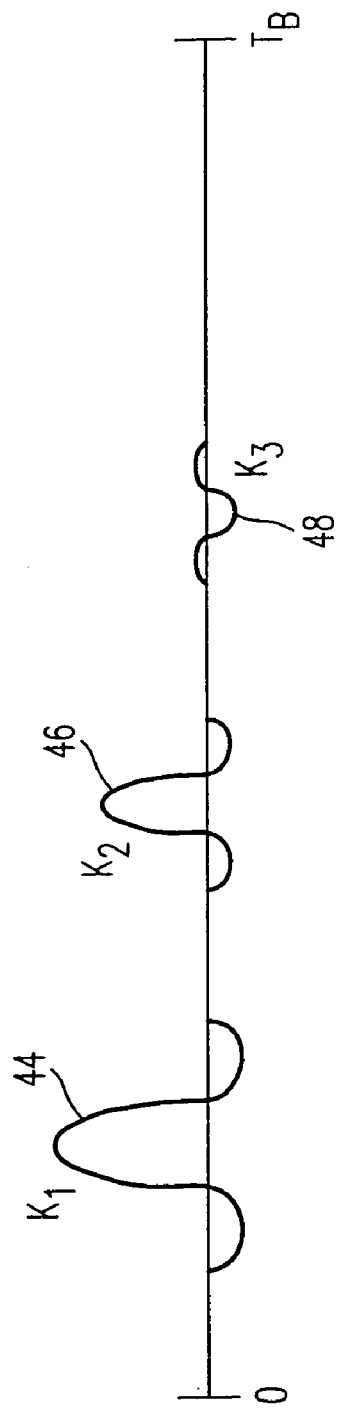
FIG. 15 shows correlation of locally generated pulses with an incoming signal when multiple terms are present.

When multiple correlation arms are available, it is possible to lock onto and track multiple multipath terms. FIG. 15 shows the correlation of the locally generated pulse train with the incoming signal when there are multipath terms present. Correlation peaks 44, 46, and 48 demonstrate three possible paths that can produce data signals of varying qualities. In narrowband systems, these three paths would not be so easily distinguished. However, as can be seen from FIG. 15, UWB systems have the time resolution to easily distinguish the multipath terms. If the multiple correlation arms in the current embodiment of the invention can lock onto and track these different multipath terms, the resulting signals can be combined to increase the effective SNR of the communications link.

Allow s(t) to represent the pulse stream that is modulated and transmitted from the transmitter. Then, the receive signal, in a multipath environment, is given by $$r(t) = \sum_{i=0}^{N-1} \alpha_i b(t - \tau_i) s(t - \tau_i) + n(t) \quad (15)$$

where $b(t-\tau_i)$ is the bit stream, $\alpha_i$ is the amplitude of the $i^{th}$ multipath term, N is the number of multipath terms, and n(t) is additive white Gaussian noise. Each correlation arm within the receiver can lock onto a different multipath term. After sampling, the signal of the $k^{th}$ correlation arm, $A_k$, is given by $r_k = \beta_k b(j) + n_k$ where $\beta_k$ is the post-compression, sampled multipath coefficient, b(j) is the $j^{th}$ bit value in the data sequence, and $n_k$ is the sampled noise component. Before the multipath terms can be combined, the coefficients $\beta_k$ must be determined. These coefficients can be determined through observation of the sampled data streams. For example, assume that a transmitted data packet includes in the header a known pattern of duration Q bits. The received bit samples received by the $k^{th}$ correlation arm can be vectorized and written as $\overline{r_k} = \beta_k \overline{b} + \overline{n_k}$.

Since the data stream $\overline{b}$ is known, the estimate of $\beta_k$ is.

$$\hat{\beta}_k = \frac{\overline{b}^T \overline{r_k}}{\overline{b}^T \overline{b}} = \frac{1}{Q} \overline{b}^T \overline{r_k}. \quad (17)$$

After all of the multipath coefficients have been estimated, the data streams from each path must be aligned. It is possible that certain multipath terms can be delayed multiple bits from other multipath terms due to differences in path lengths. Thus, the data streams from the different arms must be correlated and aligned in synchronization coordinator 290. There are many methods for performing this alignment.

After the data streams from the multiple arms have been aligned, the samples from these arms can be combined to provide a higher SNR signal. This combining of multipath terms is often referred to as RAKE. The series of observations for bit i from the various correlator arms is given by $\overline{X_i} = b_i \overline{\beta} + \overline{n}$ where the vector length are equal to the number of correlator arms N, and $\bar{n}$ is a white Gaussian noise vector. Combining the observations from the various correlation arms, the estimate of $b_i$ is.

$$\hat{b}_i = \text{sign}\left\{\frac{\beta^T X_i}{\beta^T \beta}\right\} \quad (17)$$

The term in the argument of the sign is the least-squares solution for both amplitude and sign of bi. If the noise vector $\bar{n}$ is not white, a weighted least-squares estimate may be used instead. A discussion of least-squares and weighted least-squares estimates can be found in Matrix Computations by Golub and Van Loan in *Matrix Computations*, 1989, the contents of which are incorporated herein by reference.

The above contains a discussion of RAKE receiver techniques. A more thorough description is given by Rappaport in *Wireless Communications Principles and Practice*, 1996, the entire contents of which are incorporated herein by reference.

Figure 16:
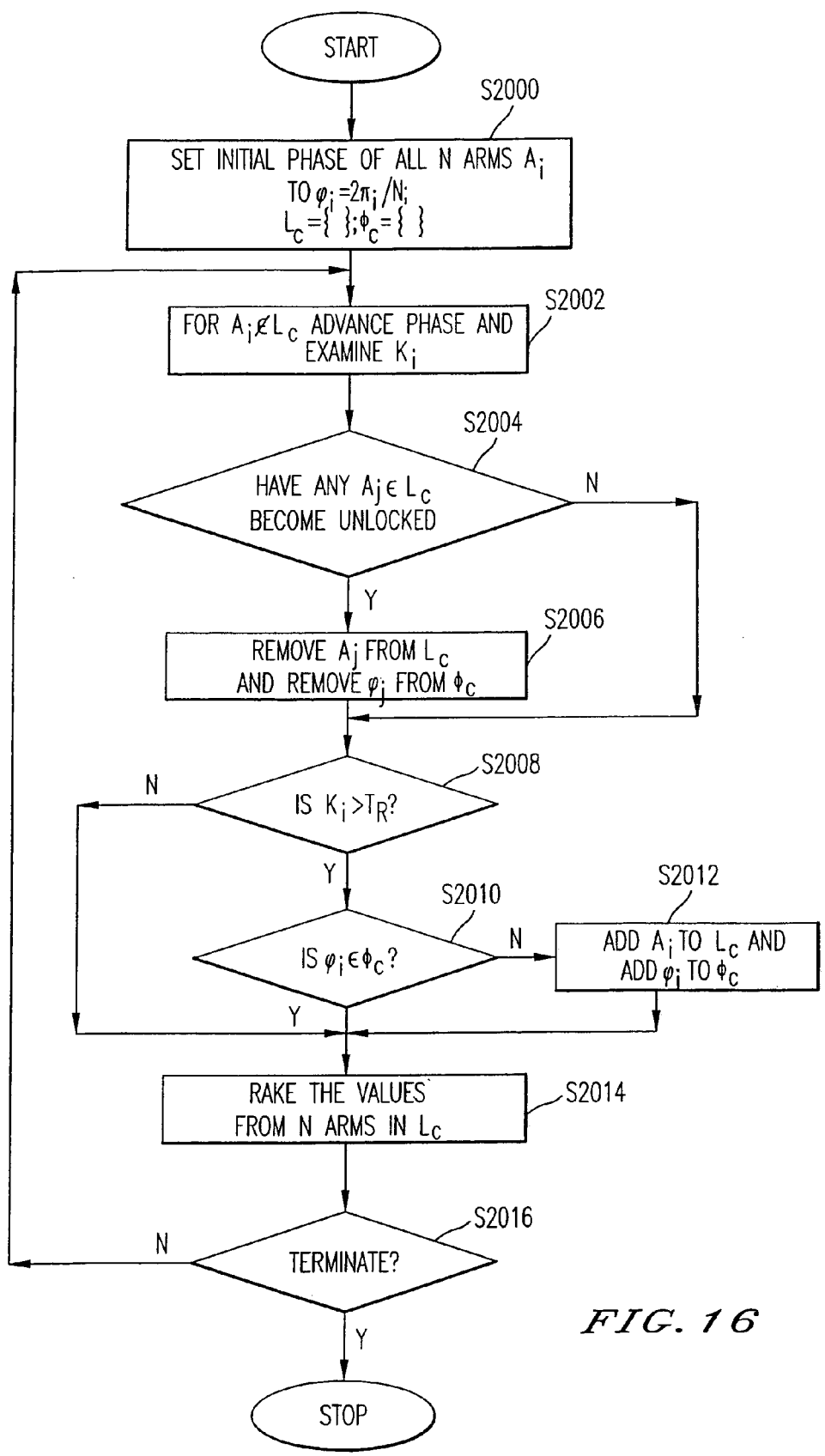
FIG. 16 is a flowchart outlining the general steps of another embodiment of the present invention that implements a RAKE receiver.
Figure 17A:
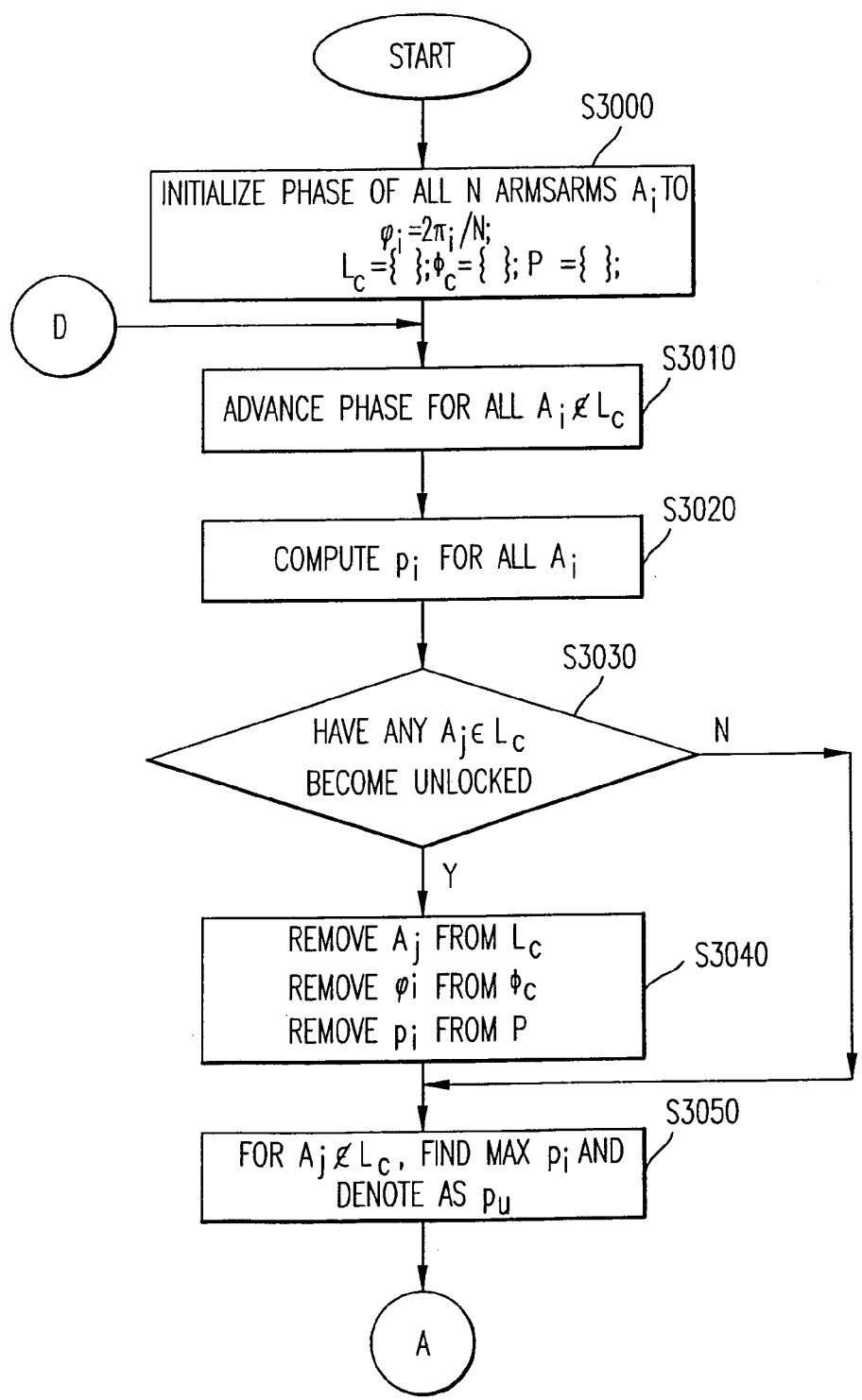
FIGS. 17A through 17D show a flowchart outlining the general steps of still another embodiment of the present invention of a RAKE receiver where at least one arm is scanning phase at a given time.
Figure 17B:
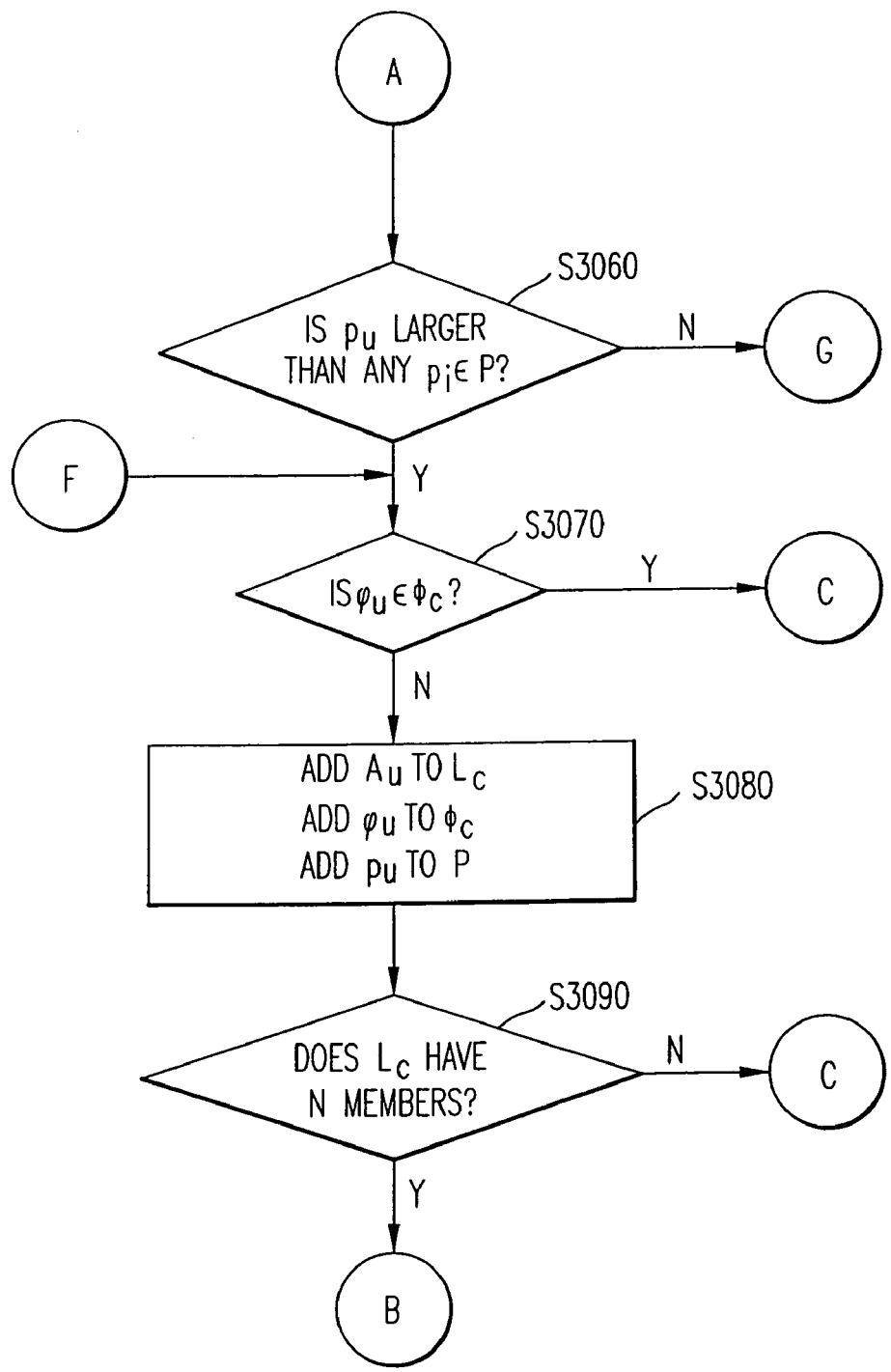
Figure 17C:
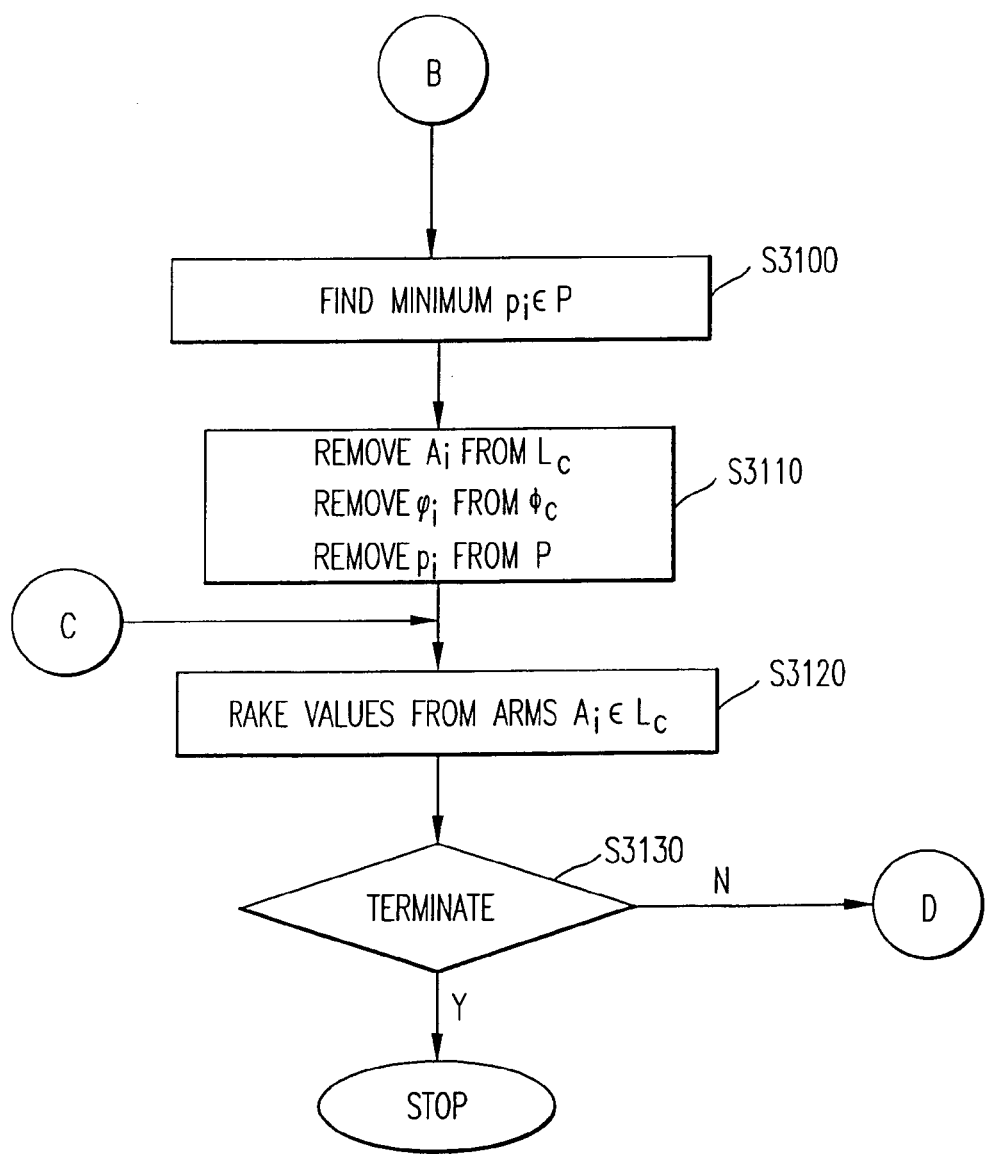
Figure 17D:
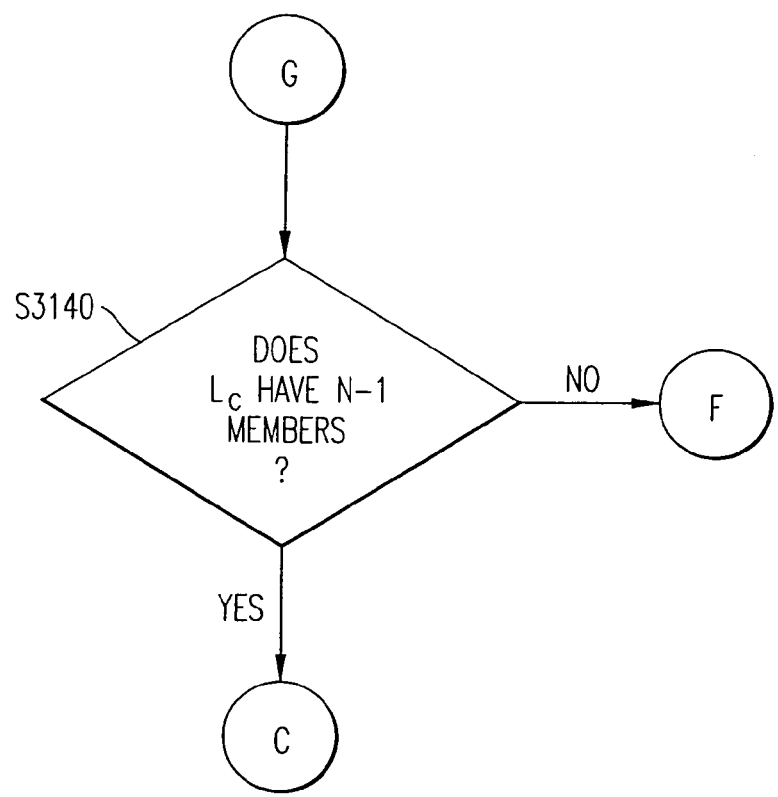

The flowchart in FIG. 16 demonstrates an embodiment of a multiple correlator arm UWB receiver that implements a RAKE receiver. In step S2000, the phases of the N arms $A_o, \ldots, A_{n-1}$ and are initialized to $$\phi_i = \frac{2\pi i}{N}.$$

Typical values for N may be two or three, but the invention is not limited in the number of correlator arms that can be employed, cost permitting. The set of correlator arms that are locked to an incoming signal $L_c$ is initialized to the empty set. The set of phases to which these correlators are locked, $\Phi_c$, is also initialized to the empty set. In step S202, the phases of the unlocked correlator arms ($A_i \notin L_c$) are advanced and the resulting correlation values ki are examined. In step S2004, an inquiry is made as to whether any of the previously locked correlators have become unlocked due to instructions from a mode controller. If the answer is Yes, the recently unlocked arms are removed from the set $L_c$ and their corresponding phases are removed from $\Phi_c$. In step S2008, an inquiry is made as to whether any of the correlation values computed in step S2002 exceed a threshold. Equivalently, a parameter that is based on $K_i$ and related to BER can be computed and compared to the relevant threshold, for example, a BER of 0.001. If the answer is yes, step 2010 checks to see if the phase of correlated $A_i$, $\phi_i$ is already in the set $\Phi_c$. If the answer is no, $A_i$ is included in $L_c$, and $\phi_i$ is included in $\Phi_c$. Next, RAKEing is performed in on the sample values of the locked correlation arms in step S2014. Care is taken not to include the locked arms that have not yet been data aligned. Then, an inquiry is made whether or not to terminate the process in step S2016. If the answer is yes, the process stops. Otherwise, the process flow returns to step S2002. Not all correlation arms in FIG. 3 must be employed for RAKEing. For example, one arm can be scanning phase while the others are locked to multipath terms. As soon as the scanning arm finds a multipath term that exceeds the performance of any of the other arms, the scanning arm becomes a locked arm, and the worst performing (as in lowest SNR) arm becomes the scanning channel. The methods of scanning phase can be any of those previously discussed.

The technique of having a continuously scanning channel can be employed regardless of the number of available arms. Once possible embodiment, however, could have three correlation arms with two locked to multipath signals and one arm scanning phase.

FIGS. 17A through 17D show an embodiment of a multiple correlation arm receiver where at least one of the correlation arms is scanning phase at any given time. The sets $L_c$ and $\Phi_c$ are defined as previously stated. Let $p_i$ be a parameter related to SNR for correlator arms $A_i$. For example, $p_i$ may be the correlation values $K_i$ defined in FIG. 5. Define the set P such that for all $A_i \in L_c$, the corresponding $p_i \in P$. In step S3000, the phases $\phi_i$ are initialized, and the sets $L_c$, $\Phi_c$, and P are all initialized to the empty set. In step S3010, the phase of all the unlocked $A_i$ are advanced. In step S3020, the parameter $p_i$ is computed for each $A_i$. In step S3030, a determination is made as to whether or not the mode controller has unlocked any of the $A_i \in L_c$. If the answer is yes, $A_i$ is removed from $L_c$, $\phi_i$ is removed from $\Phi_c$, and $p_i$ is removed from P in step S3040. In step S3050, the maximum $p_i$, denoted $p_u$, is found from the collection of $p_i$ corresponding to $A_i \notin L_c$. In step S3060, a determination is made as to whether $p_u$ is larger than any $p_i \in P$. If not, execution jumps to step S3140 where $L_c$ is checked to have N-1 members. If the answer is yes, the flow process jumps to S3120. If the answer is no, the flow process jumps to S3070.

If the answer in step S3060 is yes, an inquiry is made as to whether or not the corresponding phase, $\phi_u$ already belongs to the set $\Phi_c$ (within an error margin, for example 100 pico-seconds) in step S3070. If $\phi_u \in \Phi_c$, then execution jumps to step S3120. If the answer is no, the corresponding correlation arm $A_u$ is included in $L_c$, $\phi_u$ is included in $\Phi_c$, and $p_u$ is included in P in step S3080. In step S3090, $L_c$ is checked to see if all $A_i$ are in $L_c$. If $L_c$ does not include all $A_i$, then execution jumps to step S3120. Otherwise, the minimum $p_i \in P$ is found in step S3100. The corresponding $A_i$ is removed from $L_c$, $\phi_i$ is removed from $\Phi_c$, and $p_i$ is removed from P in step S3110. In step S3120, the sample values from the locked arms are combined. Care is taken to ensure that sampled that have not yet been data aligned are not included. In step S3130, an inquiry is made whether to terminate the process. If the answer is yes, the process stops. Otherwise, the process flow returns to step S3010.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for identifying a phase of an incoming ultrawide bandwidth (UWB) signal at a UWB receiver, comprising the steps of:
   receiving incoming pulses of the incoming UWB signal, adjacent pulses of said incoming pulses arriving at a predetermined interval;
   generating first local pulses at a first detecting arm in the UWB receiver;
   generating second local pulses at a second detecting arm in the UWB receiver;
   correlating the first and second local pulses with the incoming pulses to produce first and second correlation functions, respectively;
   selecting one of the first and second detecting arms to identify the phase based on the first and second correlation functions, and to demodulate data from the incoming UWB signal; and selecting another of the first and second detecting arms to vary its operational phase and continue to correlate the first or second local pulses with the incoming pulses to refine the phase.

2. A method of claim 1, wherein the predetermined interval is the time between the incoming pulses.

3. A method of claim 1, wherein the incoming pulses are at least one of bi-phase modulated, and quadrature phase modulated.

4. A method of claim 3, wherein the incoming pulses are multilevel pulses.

5. A method of claim 1, wherein the step of correlating the first and second local pulses with the incoming pulses to produce the correlation functions comprises:
   shifting a first phase of the first local pulses;
   shifting a second phase of the second local pulses;
   calculating a first correlation value of the first local pulses and the incoming pulses; and
   calculating a second correlation value of the second local pulses and the incoming pulses,
   wherein the first correlation value is greater than the second correlation value.

6. A method of claim 5, wherein the correlation functions comprises the first and second correlation values.

7. A method of claim 5, wherein the correlation functions are determined based on the first and second correlation values.

8. A method of claim 1,
   wherein the selecting of one of the first and second detecting arms further comprises:
      determining when the first correlation function, corresponding to the first detecting arm, exceeds a predetermined threshold;
      determining when the second correlation function, corresponding to the second detecting arm, exceeds the predetermined threshold;
      comparing the first correlation function to the second correlation function;
      selecting the first detecting arm to identify the phase if the first correlation function is greater than the second correlation function; and
      selecting the second detecting arm to identify the phase if the second correlation function is greater than the first correlation function, and
   wherein the predetermined threshold is based on a desired bit error rate of the incoming UWB signal.

9. A method of claim 1, wherein the step of selecting one of the first and second detecting arms comprises:
   finding a first correlation value for the first detecting arm that exceeds a predetermined threshold;
   determining a first phase corresponding to the first correlation value;
   finding a second correlation value for the second detecting arm that exceeds the predetermined threshold over a phase range beginning with the first phase; and
   comparing the first correlation value to the second correlation value to select the first detecting arm when the first correlation value is greater than the second correlation value, and to select the second detecting arm when the second correlation value is greater than the first correlation value.

10. A system for identifying a phase of an incoming ultrawide bandwidth (UWB) signal at a UWB receiver, comprising:
   an antenna configured to receive incoming pulses of the incoming UWB signal, adjacent pulses of said incoming pulses occurring at a predetermined interval;
   a first signal generator configured to generate first local pulses;
   a second signal generator configured to generate second local pulses;
   a first correlator configured to correlate the incoming pulses with the first local pulses to produce a first correlation function, and configured to demodulate data from the incoming UWB signal;
   a second correlator configured to correlate the incoming pulses with the second local pulses to produce a second correlation function, and configured to demodulate data from the incoming UWB signal; and
   a selector configured to select one of the first and second correlators to identify the phase based on the first and second correlation functions and to demodulate data from the incoming UWB signal, and to select another of the first and second correlators to perform a phase refining function.

11. A system of claim 10, wherein the predetermined interval is a distance between the incoming pulses in time.

12. A system of claim 10, wherein the incoming pulses are at least one of bi-phase modulated, and quadrature phase modulated.

13. A system of claim 12, wherein the incoming pulses are multilevel pulses.

14. A system of claim 10, wherein the first correlator comprises:
   a phase adjuster configured to adjust a phase of the first local pulses; and
   a calculator configured to calculate a first correlation value of the first local pulses and the incoming pulses.

15. A system of claim 14, wherein the first correlation function comprises a plurality of first correlation values.

16. A system of claim 10,
   wherein the first correlator is in a first detecting arm,
   wherein the second correlator is in a second detecting arm, and
   wherein the selector comprises:
      a calculator configured to find when the first correlation function exceeds a predetermined threshold and when the second correlation function exceeds the predetermined threshold; and
      a comparator configured to compare the first correlation function to the second correlation function to select the first detecting arm when the first correlation function is greater than the second correlation function, and to select the second detecting arm when the second correlation function is greater than the first correlation function.

17. A system of claim 16, wherein the predetermined threshold is based on a desired bit error rate of the incoming UWB signal.

18. A system of claim 10,
   wherein the first correlator is in a first detecting arm,
   wherein the second correlator is in a second detecting arm, and
   wherein the selector comprises:
      a calculator configured to find when the first correlation function exceeds a predetermined threshold and a when the second correlation function exceeds the predetermined threshold over a phase range beginning with a first phase;
      a detector configured to determine the first phase corresponding to the first correlation function; and
      a comparator configured to compare the first correlation function to the second correlation function to select the first detecting arm when the first correlation function is greater than the second correlation function, and to select the second detecting arm when the second correlation function is greater than the first correlation function.

19. A system of claim 18, wherein the predetermined threshold is based on a desired bit error rate of the incoming UWB signal.

20. A system for identifying a phase of an incoming ultrawide bandwidth (UWB) signal at a UWB receiver, comprising:
   means for receiving incoming pulses of the incoming UWB signal, adjacent pulses of said incoming pulses arriving at a predetermined interval;
   means for generating first local pulses at the UWB receiver;
   means for correlating the first local pulses with the incoming pulses to produce a first correlation function, and for demodulating data from the incoming UWB signal;
   means for generating second local pulses at the UWB receiver;
   means for correlating the second local pulses with the incoming pulses to produce a second correlation function, and for demodulating the data from the incoming UWB signal; and
   means for selecting one of first and second detecting arms to identify the phase and demodulate the data from the incoming UWB signal based on the first and second correlation functions, and for selecting another of the first and second detecting arms to continue to produce either the first or second correlation function.

21. A method for identifying a phase of an incoming ultrawide bandwidth (UWB) signal at a UWB receiver, comprising the steps of:
   receiving incoming pulses of the incoming UWB signal, adjacent pulses of said incoming pulses arriving at a predetermined interval;
   generating local pulses at the UWB receiver;
   correlating the local pulses with the incoming pulses to produce a correlation function; and
   selecting one of first and second a detecting arms to identify the phase based on the correlation function,
   wherein the step of selecting the one of first and second detecting arms to identify the phase based on the correlation function comprises:
      finding a first correlation value for the first detecting arm that exceeds a predetermined threshold;
      decreasing the predetermined threshold until the first correlation value is found;
      finding a second correlation value for the second detecting arm that exceeds the predetermined threshold, after decreasing the predetermined threshold; and
      comparing the first correlation value to the second correlation value to select the first detecting arm when the first correlation value is greater than the second correlation value, and to select the second detecting arm when the second correlation value is greater than the first correlation value.

22. A method of claim 21, wherein the predetermined threshold is based on a desired bit error rate of the incoming UWB signal.

23. A system for identifying a phase of an incoming ultrawide bandwidth (UWB) signal at a UWB receiver, comprising:
   an antenna configured to receive incoming pulses of the UWB signal, adjacent pulses of said incoming pulses occurring at a predetermined interval;
   a signal generator configured to generate local pulses;
   a correlator configured to correlate the incoming pulses with the local pulses to produce at least two correlation functions; and
   a selector configured to select one of first and second a detecting arms to identify the phase based on the at least two correlation functions,
   wherein the selector comprises:
      a calculator configured to find a first correlation value selected from the at least two correlation functions for the first detecting arm that exceeds a predetermined threshold and a second correlation value selected from the at least two correlation functions for the second detecting arm that exceeds the predetermined threshold;
      a subtractor configured to decrease the predetermined threshold until the first correlation value is found; and
      a comparator configured to compare the first correlation value to the second correlation value to select the first detecting arm when the first correlation value is greater than the second correlation value, and to select the second detecting arm when the second correlation value is greater than the first correlation value.

24. A system of claim 23, wherein the predetermined threshold is based on a desired bit error rate of the incoming UWB signal.

25. A method for processing an incoming ultrawide bandwidth (UWB) signal at a UWB receiver, comprising the steps of:
   receiving incoming pulses of the incoming UWB signal;
   generating first local pulses at the UWB receiver at a first phase in a first detecting arm;
   correlating the first local pulses with the incoming pulses in the first detecting arm to produce a first correlation function;
   comparing the first correlation function with a predetermined threshold;
   tracking the phase of the incoming signal and demodulating data from the incoming UWB signal with the first detecting arm using the first phase, if the first correlation function is greater than the predetermined threshold;
   generating second local pulses at the UWB receiver at a second phase different from the first phase in a second detecting arm, after comparing the first correlation function with the predetermined threshold;
   correlating the second local pulses with the incoming pulses to produce a second correlation function;
   comparing the first correlation function with the second correlation function; and
   tracking the phase of the incoming signal and demodulating the data from the incoming UWB signal with the second detecting arm using the second phase if the second correlation function is greater than the first correlation function.

26. A method of claim 25, further comprising incrementing the second phase by a phase increment and repeating the steps of tracking the phase of the incoming signal with the first detecting arm, generating second local pulses at the UWB receiver at the second phase, correlating the second local pulses, and comparing the first correlation function with the second correlation function, if the second correlation function is not greater than the first correlation function.

27. A method of claim 25, wherein when the second correlation function is greater than the first correlation function, the method further comprises:
- varying the first phase to a new first phase; and
- generating new first local pulses at the UWB receiver at the new first phase in the first detecting arm;
- correlating the new first local pulses with the incoming pulses to produce a new first correlation function;
- comparing the new first correlation function with the second correlation function,
- wherein the new first phase is different from the second phase.

28. A system for processing an incoming ultrawide bandwidth (UWB) signal at a UWB receiver, comprising:
- an antenna configured to receive incoming pulses of the incoming UWB signal;
- a first detecting arm including:
  - a first signal generator configured to generate first local pulses, and
  - a first tracking correlator configured to correlate the incoming pulses with the first local pulses to produce a first correlation function, and configured to demodulate data from the incoming UWB signal;
- a second detecting arm including:
  - a second signal generator configured to generate second local pulses;
  - a second tracing correlator configured to correlate the incoming pulses with the second local pulses to produce a second correlation function, and configured to demodulate the data from the incoming UWB signal; and
- a selector configured to select one of the first and second detecting arms to identify a phase of the incoming UWB signal based on the first and second correlation functions and to demodulate the data from the incoming UWB signal, and configured to select another of the first and second detecting arms to continue to produce either a first or second correlation function.

* * * * *

UNITED STATES PATENT AND TRADEMARK OFFICE
CERTIFICATE OF CORRECTION

PATENT NO. : 7,079,604 B1  Page 1 of 1
APPLICATION NO. : 09/685196
DATED : July 18, 2006
INVENTOR(S) : Timothy R. Miller It is certified that error appears in the above-identified patent and that said Letters Patent is hereby corrected as shown below:

In Column 28, Line 59, Claim No. 18:
    Change "threshold and a" to --threshold and--

Signed and Sealed this

Twenty-ninth Day of July, 2008

JON W. DUDAS
*Director of the United States Patent and Trademark Office*